(12) United States Patent
Nakajima

(10) Patent No.: US 6,205,857 B1
(45) Date of Patent: Mar. 27, 2001

(54) ANGULAR VELOCITY SENSING DEVICE

(75) Inventor: Fumio Nakajima, Tokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/256,312

(22) Filed: Feb. 24, 1999

(30) Foreign Application Priority Data

| | | | |
|---|---|---|---|
| Feb. 25, 1998 | (JP) | ................................. | 10-043139 |
| Mar. 25, 1998 | (JP) | ................................. | 10-077165 |
| Apr. 7, 1998 | (JP) | ................................. | 10-094273 |
| Jan. 7, 1999 | (JP) | ................................. | 11-001564 |
| Jan. 29, 1999 | (JP) | ................................. | 11-021536 |

(51) Int. Cl.$^7$ ........................................................ G01P 9/04
(52) U.S. Cl. ........................................................ 73/504.16
(58) Field of Search ........................... 73/504.16, 504.15, 73/504.12; 310/319, 370

(56) References Cited

U.S. PATENT DOCUMENTS

| | | | |
|---|---|---|---|
| 5,329,816 | 7/1994 | Söderkvist | ................ 73/505 |
| 5,426,970 | 6/1995 | Florida | ..................... 73/1 D |
| 5,451,828 | * 9/1995 | Tomikawa et al. | ................ 73/504.16 |
| 5,719,460 | * 2/1998 | Watari et al. | ................ 310/319 |
| 6,018,997 | * 2/2000 | Kumada et al. | ................ 73/504.16 |

FOREIGN PATENT DOCUMENTS

| | | |
|---|---|---|
| 3-10112 | 1/1991 | (JP) . |
| 7-77538 | 3/1995 | (JP) . |
| 2681237 | 8/1997 | (JP) . |

\* cited by examiner

*Primary Examiner*—John E. Chapman
(74) *Attorney, Agent, or Firm*—Armstrong, Westerman, Hattori, McLeland & Naughton, LLP

(57) ABSTRACT

A tuning-fork sensor is formed with a piezoelectric single crystal and its drive arm 101 is self-excitedly vibrated by an oscillation circuit at a resonance frequency f0 in a predetermined direction. A sensor arm 102 also vibrates in the same direction in synchronization with the drive arm, and forcibly vibrates in the direction orthogonal to the direction of the vibration at the same frequency as f0 by a Coriolis force induced by the rotation. First sensor electrodes of the sensor arm are connected to a ground wire, a positive-input terminal of an operational amplifier forming a sensor circuit is connected to the ground wire, second sensor electrodes and a negative-input terminal are connected to each other, and the negative-input terminal and an output terminal are connected to each other through a feedback resistor 33.

6 Claims, 25 Drawing Sheets

ANGULAR VELOCITY SENSING DEVICE

BACKGROUND OF THE INVENTION

1. Field of the Invention

The present invention relates to an angular velocity sensing device using a tuning-fork sensor or a three-forked tuning sensor comprising of a piezoelectric single crystal.

2. Description of the Related Art

An angular velocity sensing device using a mechanical rotor-based gyroscope has long been used as an inertial navigation system for aircraft and ships. The mechanical rotor-based gyroscope is excellent in stability and performance but, on the other hand, it has disadvantages owing to its large size, high cost, and short life.

In recent years, in place of the mechanical rotor-based gyroscope, development of small vibrating gyroscope for practical use has been proceeding, in which a vibration member is excited to vibrate with a polycrystalline piezoelectric device which is piezoceramic made of barium titanate and lead zirconate series, and voltage produced by a vibration caused by a Coriolis force induced by the rotational angular velocity is detected with a piezoelectric device.

For instance, an angular velocity sensing device comprised of a gyroscope using a tuning-fork sensor is proposed in Japanese laid-open patent publication No. Hei 3-10112.

Here, an angular velocity sensing device using a conventional gyroscope will be briefly explained. The angular velocity sensing device disclosed in the above-described publication has a configuration in which a piezoelectric device for driving is provided on a tuning-fork sensor having a central connecting section, and the central connecting section extending from a base of the tuning-fork sensor is supported by a cylindrical pipe member which serves as a case through a hinge section arranged in the direction orthogonal to the central connecting section.

The tuning-fork sensor is vibrated by applying AC voltage to the piezoelectric device for driving, and the hinge section performs bending vibration while deforming in an S-shape due to a Coriolis force induced by the rotation of the cylindrical pipe member. Voltage is produced in the piezoelectric device for detection provided on the hinge section and the angular velocity is obtained by detecting the produced voltage through a voltage detection circuit.

FIG. 26 shows the voltage detection circuit using the piezoelectric device for sensing the angular velocity.

In FIG. 26, the piezoelectric device 80 for detection can be expressed equivalently with a capacitor 86 (capacitance value C3), a voltage source 84 and a resistor 85 (resistance value R5). The piezoelectric device 80 is connected across a positive-input terminal of a operational amplifier 83 and a ground, and a resistor 87(resistance value R3) is connected across a negative-input terminal of the operational amplifier 83 and a ground, a resistor 88 (resistance value R4) is connected across the negative-input terminal and an output terminal to form the voltage detection circuit by an amplification circuit.

Accordingly, voltage Vi produced by the piezoelectric device 80 is amplified into $V_0=(1+R4/R3)$ Vi through the voltage detection circuit to obtain output voltage $V_0$ which can be treated. By synchronized detection of the output voltage $V_0$ using a reference frequency of a tuning-fork sensor, the angular velocity can be obtained.

In a piezoelectric device comprised of a polycrystalline material such as piezoelectric ceramic used in the conventional example, the resistance value R5 of the equivalent resistor shown by the resistor 85 in FIG. 26 is a low value of less than 1 kΩ and has properties close to those of a constant voltage source as shown in the equivalent circuit.

Voltage produced on the piezoelectric device 80 by a piezoelectric distortion effect is in a range of several hundred microvolts to several millivolts, when angular velocity of one turn of the rotational movement of one degree per second is applied.

FIG. 27 is a graphic chart showing a theoretical limitation value of the voltage measurement and shows that noise voltage (V) linearly increases in proportion to source resistance that is an equivalent resistance (Ω) or impedance (Ω).

A noise voltage straight line 90 and a noise voltage straight line 91 are almost parallel, and a range above the noise voltage straight line 90 is the one where the produced voltage Vi can be easily detected by a simple amplifier, and a range above the noise voltage straight line 91 is the one where the produced voltage Vi can not be detected without precision measurement equipment such as an electrometer.

A range below the straight line 91 is the one where the produced voltage Vi can not be detected theoretically.

As described hereinbefore, a piezoelectric ceramic is used as a piezoelectric device, and source resistance of the piezoelectric ceramic that is an equivalent resistance or equivalent impedance is less than 1 kΩ. The noise voltage level of the noise voltage straight line 90 near the resistance value is about 1 microvolt. However, voltage produced by the piezoelectric ceramic is in a range of several hundred microvolts to several millivolts.

Accordingly, the angular velocity sensing device using a piezoelectric ceramic series piezoelectric device for detection can determine the angular velocity using a relatively simple voltage detection circuit as shown in FIG. 26.

However, such a conventional velocity sensing device has the following disadvantages.

First, since the tuning-fork sensor is configured to be supported with a cylindrical pipe member through a hinge which is provided orthogonally to the central connecting section extending from the base, the angular velocity sensing device is complicated in shape.

Further, since a plurality of piezoelectric devices need to be connected to a metal tuning-fork sensor and the hinge, the assembling process is complicated, the whole size becomes large, and cost reduction becomes difficult. Furthermore, since the metal tuning-fork sensor is used, characteristic of not being influenced by temperature is not satisfactory, and there arises a disadvantage that the characteristic is changed with time.

Second, if a single crystalline material having a source resistance (equivalent resistance) value or an equivalent electric impedance value of higher than 10 kΩ is used instead of the piezoelectric ceramic as a sensing device, voltage produced by a piezoelectric distortion effect is several microvolts in the case of an angular velocity of one degree per second.

As is clear from a chart of the noise voltage straight line 90 in FIG. 27, when source resistance (equivalent resistance) or equivalent electric impedance is more than 10 kΩ, the noise voltage of the sensing device increases to more than 1 microvolt, and owing to the noise voltage, the angular velocity can not be detected with the conventional voltage sensor circuit shown in FIG. 26, which causes a disadvantage of difficulty in making the sensing device practicable.

SUMMARY OF THE INVENTION

One object of this invention is to overcome the foregoing disadvantages by providing an angular velocity sensing device which is small in size, low in cost, has an excellent temperature characteristic, and does not change in characteristics with time. Another object of the present invention is to provide an angular velocity sensing device which can detect angular velocity even when a piezoelectric single crystal is used as a detecting element in which a source resistance, that is equivalent resistance or equivalent impedance, shows a value of higher than 10 kΩ.

To achieve the above-described objects, in the present invention, the angular velocity sensing device is configured as follows.

That is, the angular velocity sensing device according to the present invention is provided with a tuning-fork sensor. The tuning-fork sensor is formed of a piezoelectric single crystal and comprises: a drive arm which has a plurality of drive electrodes and performs self-excited vibration in a predetermined direction (the X or Z direction) at a resonance frequency; a sensor arm which has first and second sensor electrodes, vibrates in the same direction (the X or Z direction) as that of the drive arm in synchronization with the above-described drive arm, and is enforced to vibrate by a Coriolis force resulting from the rotation in the direction (the Z or X direction) orthogonal to the direction of the above-described self-excited vibration at the same frequency as the resonance frequency of the above-described drive arm; and a base which has the drive arm and the sensor arm in parallel.

Further more, it comprises an oscillation circuit which connects to each drive electrode of the drive arm of the tuning-fork sensor to vibrate the drive arm self-excitedly, and a sensor circuit having a operational amplifier to detect the vibration of the above-described sensor arm caused by the Coriolis force resulting from the rotation of the tuning-fork sensor.

The first sensor electrode of the above-described sensor arm is connected to a ground wire, the above-described sensor circuit is configured in such a manner that a positive-input terminal of the above-described operational amplifier is connected to the ground wire, the second sensor electrode of the sensor arm is connected to a negative-input terminal of the operational amplifier, and the negative-input terminal and an output terminal of the operational amplifier are connected to each other through a feedback resistor.

The above-described sensor circuit can be configured in such a manner that the positive-input terminal of the operational amplifier is connected to the above-described ground wire through a parallel circuit of resistor and capacitor, the second sensor electrode of the above-described sensor arm is connected to the negative-input terminal of the above-described operational amplifier, and the negative-input terminal of the operational amplifier is connected to the output terminal through the feedback resistor.

Alternatively, the above-described sensor circuit can be configured in such a manner that the positive-input terminal of the operational amplifier is connected to the above-described ground wire through a resistor, the second sensor electrode of the above-described sensor arm is connected to the negative-input terminal of the above-described operational amplifier, the negative-input terminal and the output terminal of the operational amplifier are connected to each other through the feedback resistor, and the output terminal and the positive-input terminal of the operational amplifier are connected to each other through an integrating circuit.

An angular velocity sensing device according to the present invention can use a three-forked tuning sensor which is configured in the following manner, instead of the above-described tuning-fork sensor.

The three-forked tuning sensor is made of a piezoelectric single crystal which comprises three pieces of arms including at least a drive arm and a sensor arm, and a base providing these three arms in parallel to each other, wherein the drive arm has a plurality of drive electrodes, and vibrates self-excitedly in the predetermined direction (the X or Z direction) at a resonance frequency, and the sensor arm has first and second sensor electrodes, vibrates in the same direction (the X or Z direction) as that of the drive arm in synchronization with the drive arm, and is forced to vibrate by a Coriolis force induced by the rotation, in the direction (the Z or X direction) orthogonal to the direction of the above self-excited vibration, at the same frequency as the resonance frequency of the drive arm.

Similar to the aforementioned angular velocity sensing device, the angular velocity sensing device connects to each drive electrode on the drive arm of the three-forked tuning sensor, and is provided with an oscillation circuit to vibrate the drive arm self-excitedly, and a sensor circuit having an operational amplifier to detect the vibration of the sensor arm caused by a Coriolis force induced by the rotation of the three-fork tuning sensor.

Further, the first sensor electrode of the above-described sensor arm is connected to a ground wire, and the sensor circuit is structured in the same manner as any one of the sensor circuits in the aforementioned angular velocity sensing device having a tuning-fork sensor.

It is recommendable that in these angular velocity sensing devices, a series circuit of a first resistor and a second resistor is connected across the output terminal of the operational amplifier forming the above-described sensor circuit and the ground wire, and the negative-input terminal of the above-described operational amplifier is connected to the output terminal through the above-described feedback resistor and the first resistor.

It is also desirable that in these angular velocity sensing devices, equivalent resistance or equivalent electric impedance between the first sensor electrode and the second sensor electrode of the above-described sensor arm is more than 10 kΩ.

Furthermore, when the resonance frequency of the self-excited vibration of the above-described drive arm is f0 (Hz), and the resonance frequency of the vibration in the direction orthogonal to the vibrating direction of the self-excited vibration of the drive arm in the above-described sensor arm is f1 (Hz), it is desirable to adjust a detuning frequency $\Delta f = f0-f1$ between the resonance frequency f0 (Hz) of the drive arm and the resonance frequency f1 (Hz) of the sensor arm in a range between f1/1000 and f1/10, or −f1/1000 and −f1/10.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferable embodiments of an angular velocity sensing device according to the present invention will be explained with reference to the drawings.

First Embodiment: FIG. 1 to FIG. 8

Figure 1:
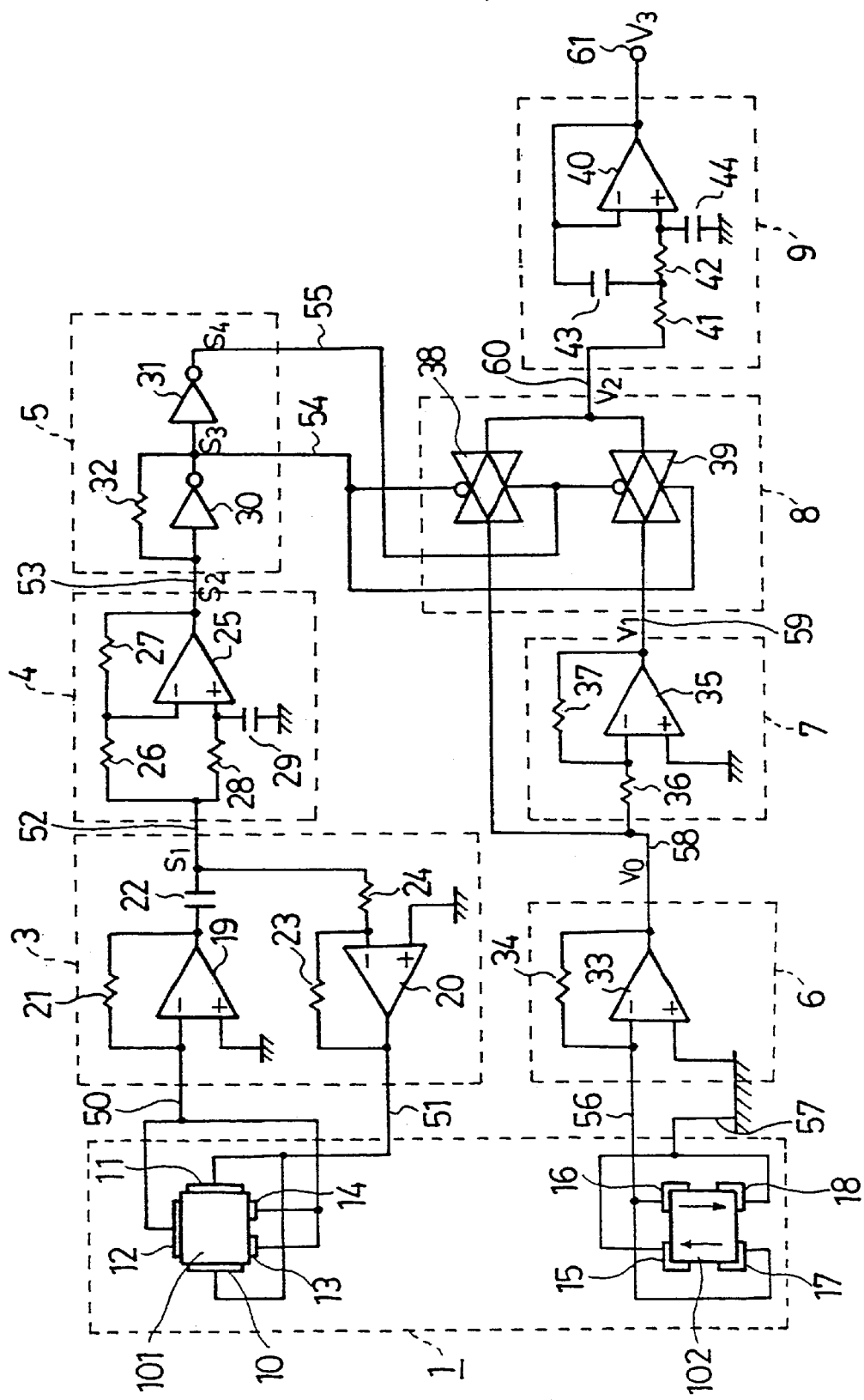
FIG. 1 is a circuit diagram showing the whole structure of a first embodiment of an angular velocity sensing device of the present invention.
Figure 2:
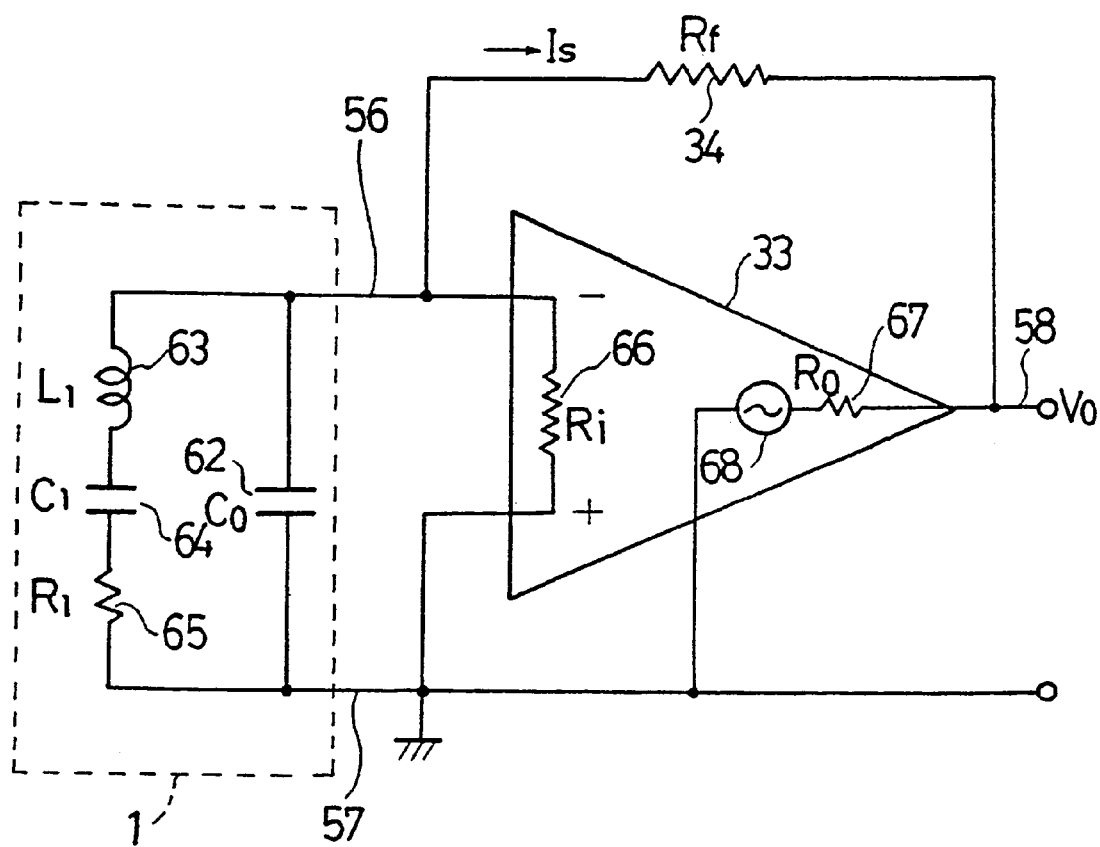
FIG. 2 is a circuit diagram explaining the principle of operation of an equivalent circuit and a sensor circuit of a tuning-fork sensor of the angular velocity sensing device.

FIG. 1 is a circuit diagram showing the whole structure of the first embodiment of an angular velocity sensing device of the present invention, FIG. 2 is a circuit diagram to explain the principle of operation of an equivalent circuit and a sensor circuit of a tuning-fork sensor of the angular velocity sensing device.

Figure 3:
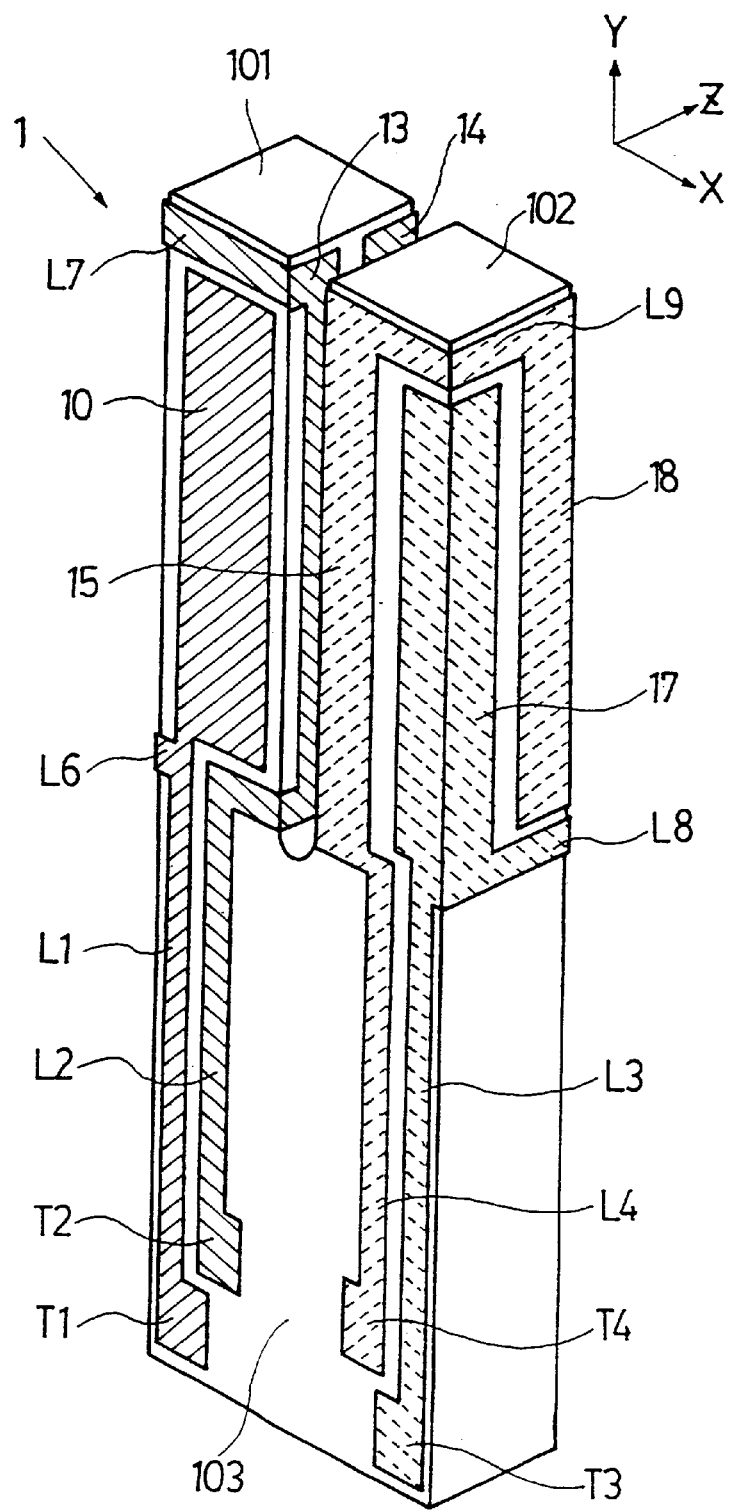
FIG. 3 is a perspective view showing an example of the outward appearance of the tuning-fork sensor seen from the front right side at an angle and FIG. 4 is a perspective view thereof seen from the back right side at an angle.
Figure 4:
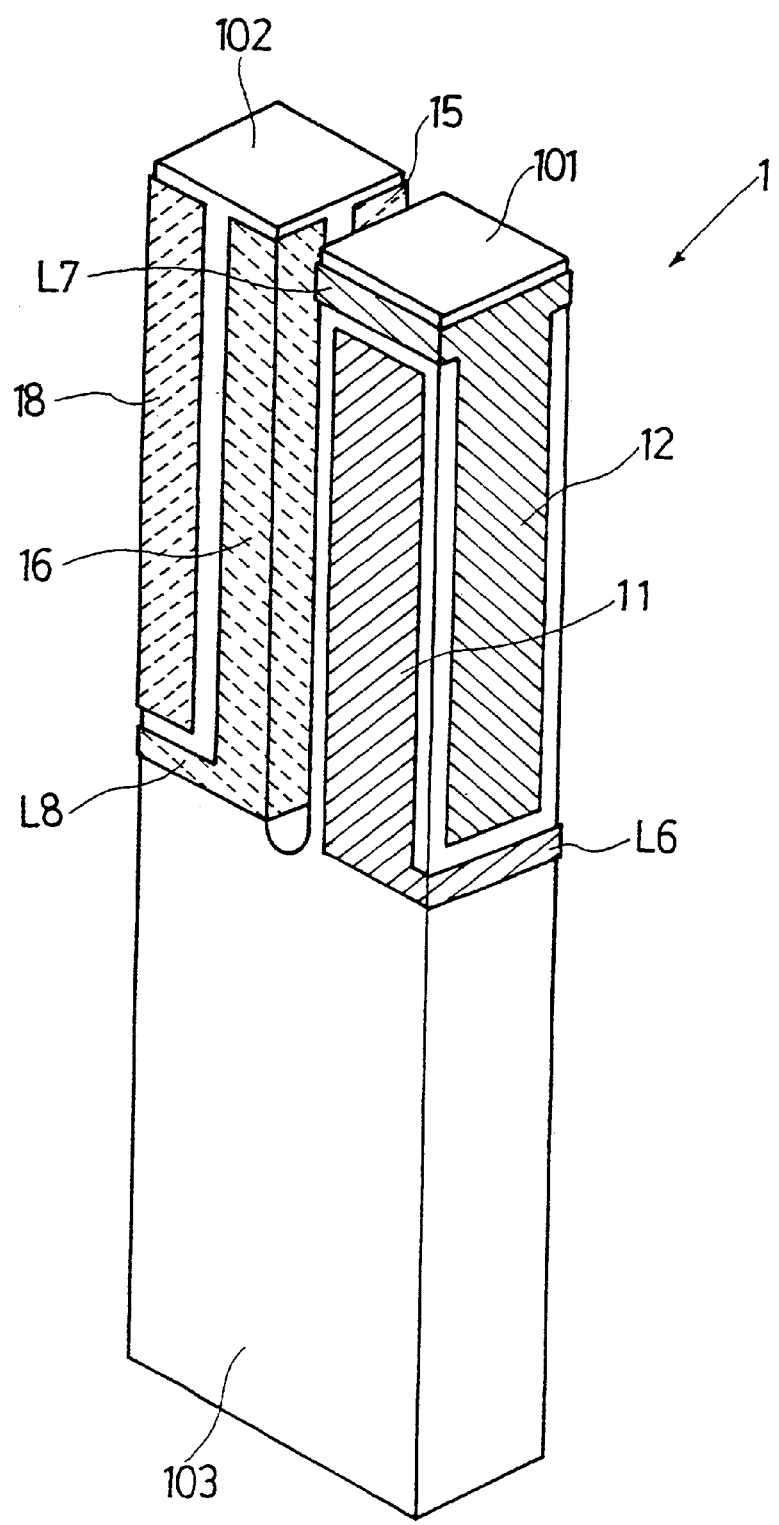
Figure 5:
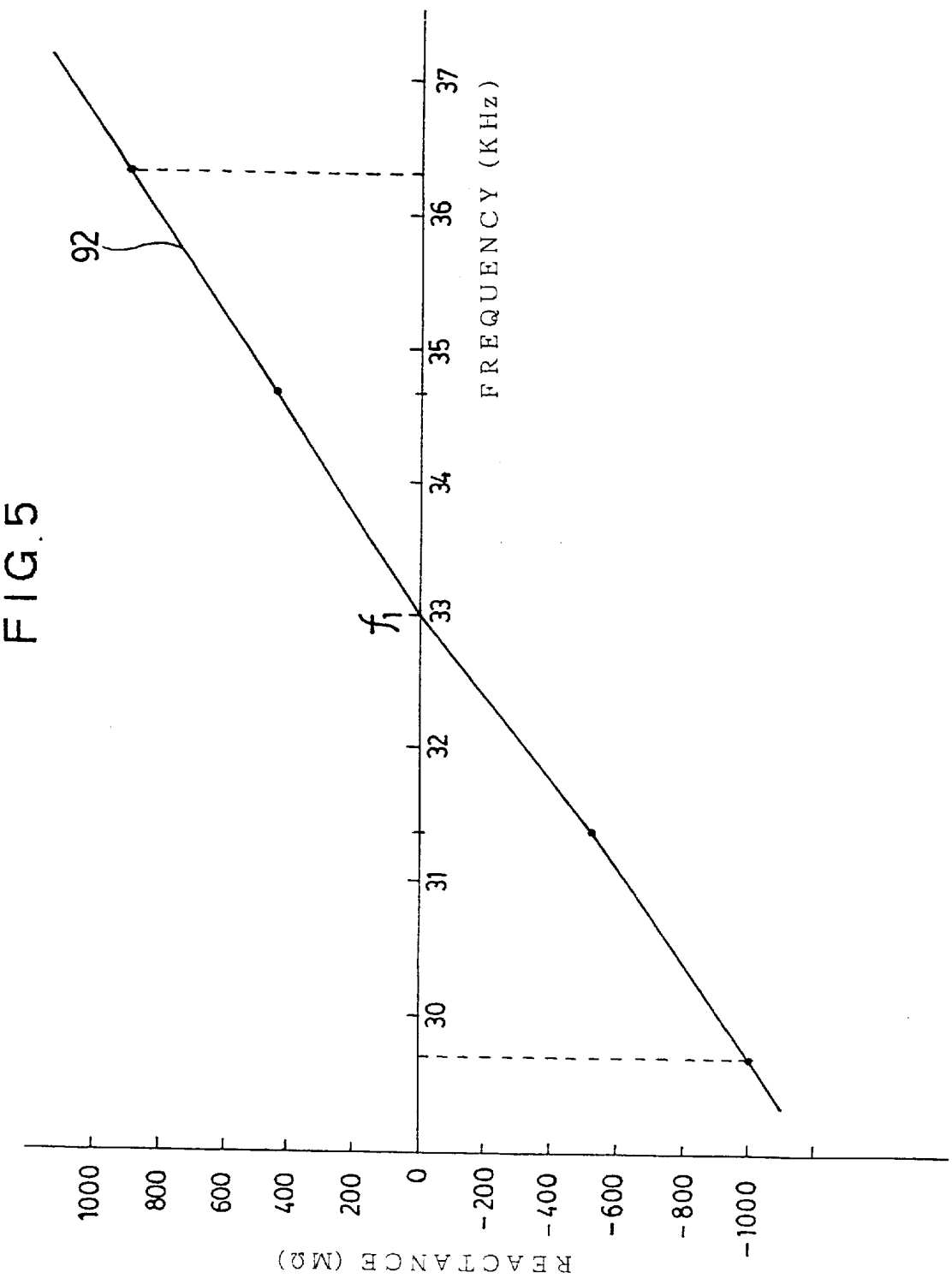
FIG. 5 is a chart showing a reactance characteristic in relation to the frequency of the sensor arm of the tuning-fork sensor in the first embodiment of the present invention.
Figure 6:
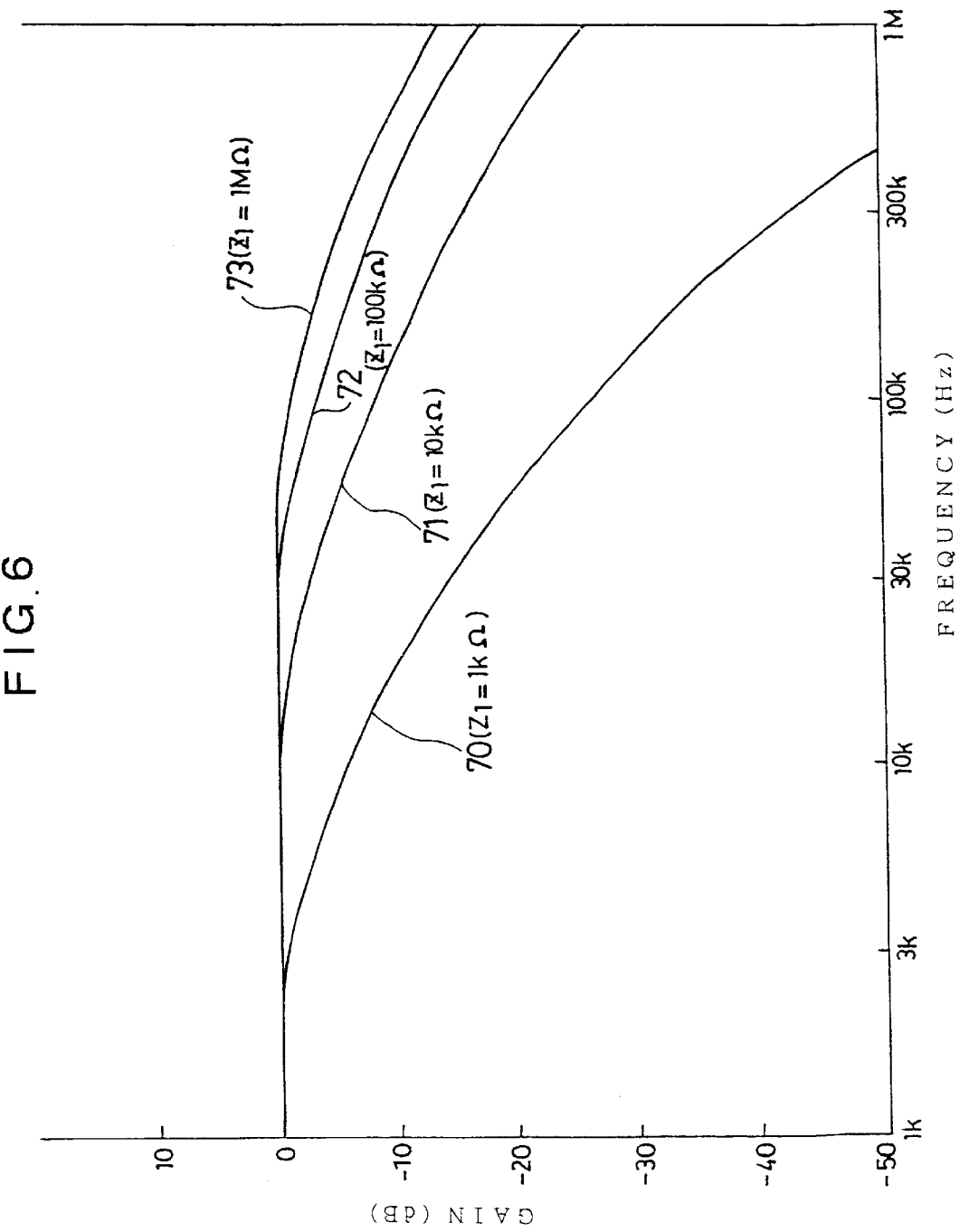
FIG. 6 is a chart showing the relation of the frequency to the gain characteristic when the input impedance of the sensor circuit shown in FIG. 1 is changed.

FIG. 3 is a perspective view showing an example of the outward appearance of the tuning-fork sensor seen from the front right side at an angle and FIG. 4 is a perspective view thereof seen from the back right side at an angle. FIG. 5 is a chart showing a reactance characteristic in relation to the frequency of the sensor arm of a quartz crystal sensor in the present embodiment, and FIG. 6 is a chart showing the relation of the frequency to the gain characteristic when the input impedance of the sensor circuit is changed.

Figure 7:
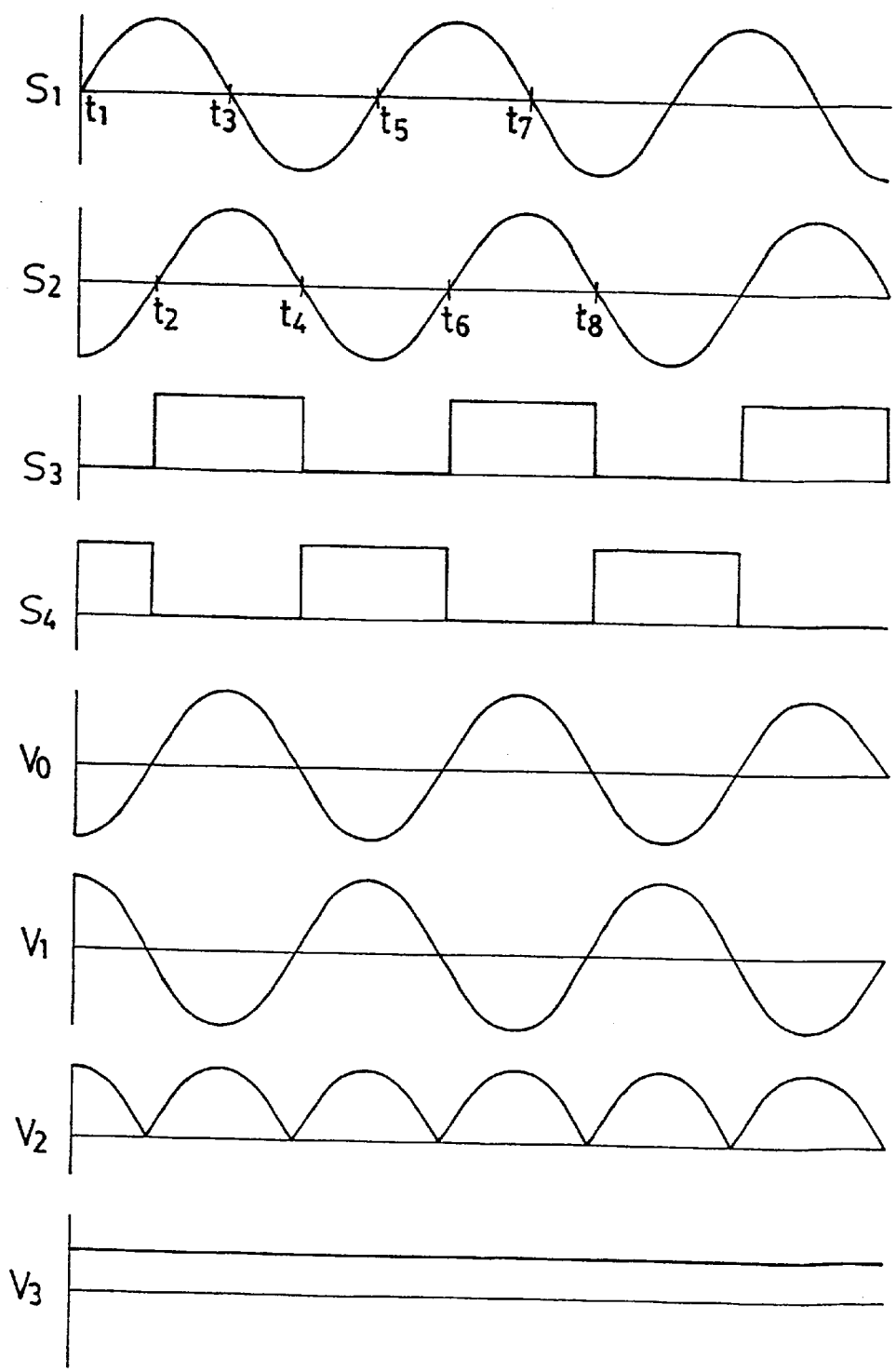
FIG. 7 shows the a waveform of each signal in FIG. 1 when the tuning-fork sensor of the angular velocity sensing device of the present invention has received the right turn angular velocity.
Figure 8:
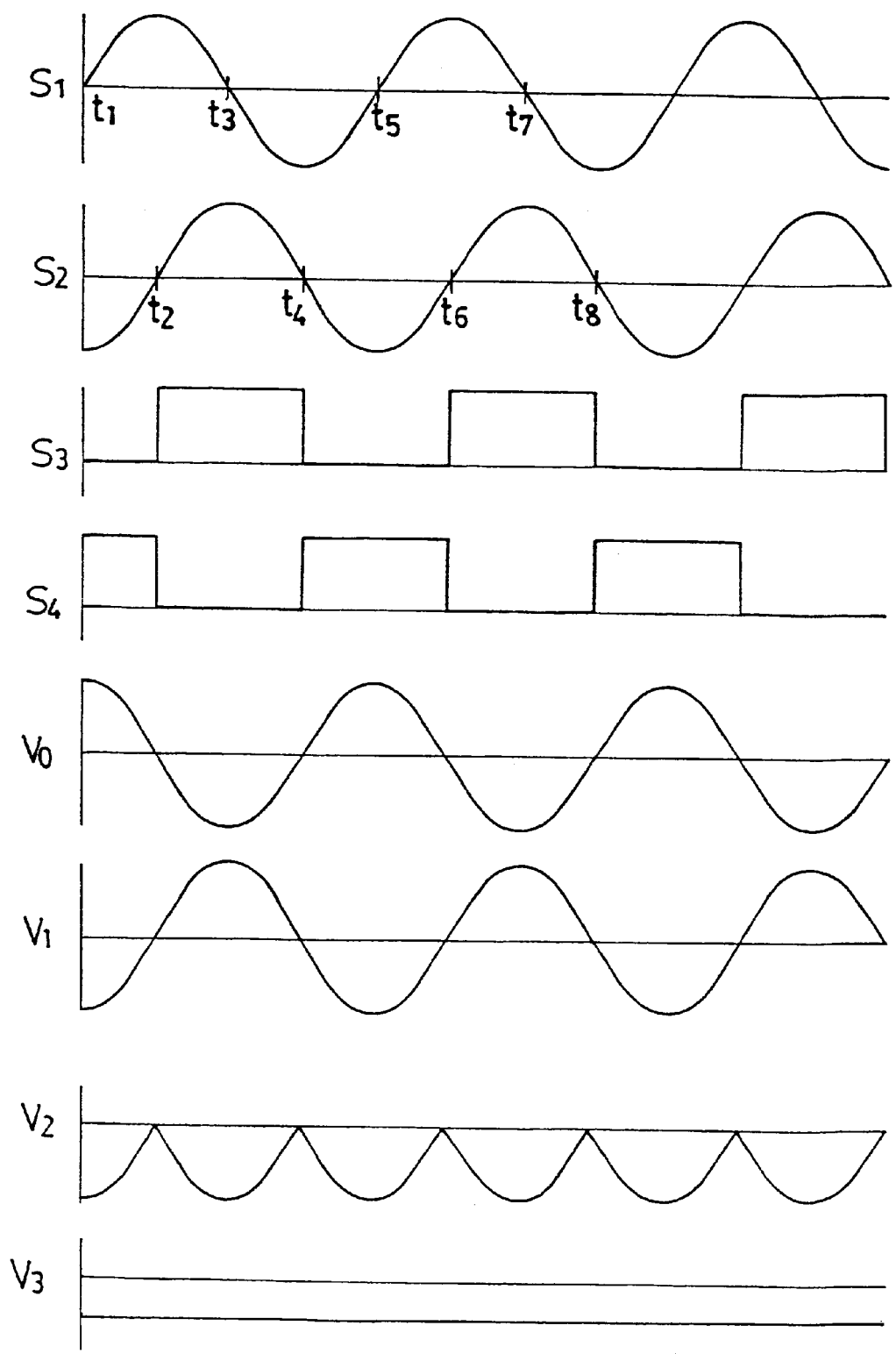
FIG. 8 shows the a waveform of each signal in FIG. 1 when the sensor has received the left turn angular velocity.

FIG. 7 shows the waveform of each signal in FIG. 1 when the tuning-fork sensor of the angular velocity sensing device of the first embodiment experiences the right turn angular velocity, and FIG. 8 shows the waveform view of each signal in FIG. 1 when the tuning-fork experiences the left turn angular velocity.

Hereinafter, the angular velocity sensing device in the first embodiment of the present invention will be explained with reference to these drawings.

A tuning-fork sensor used in this embodiment will be explained with reference to FIG. 3 and FIG. 4. The tuning-fork sensor 1 is a quartz crystal sensor, and is integrally formed of a quartz plate, that is a piezoelectric single crystal, by a mechanical processing such as by a wire-saw or the like. It is also possible to form it by a chemical process such as by etching or ion-track etching and so on. The tuning-fork sensor 1 is comprised of a drive arm 101, a sensor arm 102, and a base 103 which disposes these arms in parallel to each other. The base 103 is supported by a supporting member which is not shown.

The drive arm 101 is shaped like a square pillar, and drive electrodes 10, 11, 12, 13, 14 are formed by, vacuum vapor deposition or the like, with a metal film on each surface. The drive electrodes 10 and 11 which are disposed on two opposite surfaces are connected to each other with a connecting portion L6, and further, they are connected to a terminal T1 through a leading portion L1 formed on the base 103. The drive electrodes 12, 13, and 14 on the other two opposite surfaces are connected to each other through a connecting portion L7. Further, they are connected to a terminal T2 through a leading portion L2 formed on the base 103.

The sensor arm 102 is also shaped like a square pillar, and sensor electrodes 15, 16, 17, and 18 are formed by vacuum vapor deposition and the like with a metal film on the surfaces of the near edge portion containing respective ridge lines. The first sensor electrodes 15 and 18 opposite to each other in one diagonal direction are connected through a connecting portion L9, and further they are connected to a terminal T4 through a leading portion L4 formed on the base 103. The second sensor electrodes 16 and 17 opposite to each other in the other diagonal direction are connected through a connecting portion L8, and further they are connected to a terminal T3 through a leading portion L3 formed on the base 103. The terminals T1 to T4 are all provided on the lower portion of the front side surface of the base 103.

Here, the first embodiment will be explained using the circuit diagram in FIG. 1 showing the whole structure. The angular velocity sensing device is comprised of a tuning-fork sensor 1 explained with FIG. 3 and FIG. 4 (only the arrangement of the drive arm 101, the sensor arm 102, and each of their electrodes are shown in a top view in FIG. 1), an oscillation circuit 3, a phase-shift circuit 4, a waveform shaping circuit 5, a sensor circuit 6, an inverting circuit 7, a detecting circuit 8, and a low-pass filter 9.

The oscillation circuit 3 includes operational amplifiers 19 and 20, resistors 21, 23, 24, and a capacitor 22. The drive electrodes 12, 13 and 14 formed on the drive arm 101 of the tuning-fork sensor 1 are connected on the drive arm 101 as described above, and are connected to a negative-input terminal of the operational amplifier 19 through a lead wire 50.

The other drive electrodes 10 and 11 are connected on the drive arm 101, and are connected to an output terminal of the operational amplifier 20 through a lead wire 51.

A positive-input terminal of the operational amplifier 19 is connected to a ground wire 57, and a negative-input terminal is connected to an output terminal through a feedback resistor 21. The output terminal of the operational amplifier 19 is connected to a negative-input terminal of the operational amplifier 20 through the capacitor 22 and the resistor 24. The negative-input terminal is connected to the output terminal through the resistor 23, and the positive-input terminal is connected to the ground wire 57.

The operational amplifier 20 and the resistors 23, 24 form an inverting voltage amplifying circuit, and the voltage amplification gain is determined in accordance with the ratio of resistance value of the resistor 23 to the resistor 24. The operational amplifier 19 and the resistor 21 form an inverting current amplifying circuit which converts current passing through the drive arm 101 of the tuning-fork sensor 1 into voltage and feeds it back to the operational amplifier 20.

The sensor circuit 6 is comprised of an operational amplifier 33 and a feedback resistor 34. The first sensor electrodes 15 and 18 formed on the sensor arm 102 of the tuning-fork sensor 1 are connected to each other on the sensor arm 102, and are connected to the ground wire 57.

The second sensor electrodes 16 and 17 formed on the sensor arm 102 are connected to each other on the sensor arm 102, and are connected to a negative-input terminal of the operational amplifier 33 through a lead wire 56.

The negative-input terminal of the operational amplifier 33 of the sensor circuit 6 is connected to an output terminal through a feedback resistor 34. The positive-input terminal of the operational amplifier 33 is connected to the ground wire 57 which is at the same electrical potential as the sensor electrode 18 and the sensor electrode 15. A short-circuit current equivalently short-circuited across the sensor electrodes 15, 18 and the sensor electrodes 16, 17 of the sensor arm 102 passes through the feedback resistor 34.

The phase-shift circuit 4 is comprised of an operational amplifier 25, resistors 26, 27 and 28, and a capacitor 29. An oscillation output signal S1 of the oscillation circuit 3 inputs to a negative-input terminal of the operational amplifier 25 through a lead wire 52 and the resistor 26 which are connected to the capacitor 22, and inputs to a positive-input terminal of the operational amplifier 25 through the resistor 28, respectively. The positive-input terminal of the operational amplifier 25 is connected to the ground wire 57 through the capacitor 29, and the negative-input terminal is connected to the output terminal through the resistor 27, respectively.

The phase-shift circuit 4 is an all pass filter and can change the phase of the oscillation output signal S1 of the oscillation circuit 3 without changing the amplification degree.

The waveform shaping circuit 5 is comprised of inverters 30, 31 and a resistor 32. An output signal S2 of the phase shift circuit 4 is inputted to the input terminal of the inverter 30 through a lead wire 53. The input terminal and the output terminal of the inverter 30 are connected to each other through the resistor 32, and the output terminal is connected to the input terminal of the inverter 31.

Detecting pulses S3 and S4, having the pulse widths of one to one in which the phases are rotated by 180°, are outputted to lead wires 54 and 55 which are connected to each output terminal of the inverters 30 and 31.

The inverting circuit 7 is composed of an operational amplifier 35, and resistors 36 and 37. A sensing signal Vo through the sensor circuit 6 inputs into a negative-input terminal of the operational amplifier 35 through a lead wire 58 and the resistor 36 of the inverting circuit 7. The negative-input terminal of the operational amplifier 35 connects to an output terminal through the resistor 37, the positive-input terminal connects to the ground wire 57. The inverting circuit 7 outputs a sensing signal (AC voltage) Vo from the sensor circuit 6 without changing the amplification gain while inverting the phase by 180°.

The detector circuit 8 is comprised of transmission gates 38 and 39. A sensing signal Vo of the sensor circuit 6 is inputted to an input terminal of the transmission gate 38 through a lead wire 58, and the output signal V1 of the inverting circuit 7 is inputted to an input terminal of the transmission gate 39 through a lead wire 59.

A detecting pulse S3, that is an output of the inverter 30 of the waveform shaping circuit 5, is applied to an inversion control terminal of the transmission gate 38 and a non-inversion control terminal of the transmission gate 39 through the lead wire 54. A sensing pulse S4, that is an output of the inverter 31, is applied to a non-inversion control terminal of the transmission gate 38 and an inversion control terminal of the transmission gate 39 through the lead wire 55. The output terminals of the transmission gates 38 and 39 are connected to a lead wire 60.

The low-pass filter 9 is comprised of an operational amplifier 40, resistors 41, 42, and capacitors 43, 44. An output signal V2 of each transmission gate of the sensor circuit 8 is inputted to a positive-input terminal of the operational amplifier 40 through the resistors 41 and 42 of the low-pass filter 9 with the lead wire 60. A positive-input terminal of the operational amplifier 40 is connected to the ground wire 57 through the capacitor 44.

A connection point of the resistor 41 and the resistor 42 is connected to a negative-input terminal and an output terminal 61 of the operational amplifier 40 through the capacitor 43. The low-pass filter 9 is a voltage source type filter which is a sort of active filter, and is attenuated at 40 dB/dec at high frequencies.

Next, operation of an angular velocity sensing device thus structured will be explained.

The oscillation circuit 3 is a positive feedback oscillator consisting of the operational amplifier 20, that is a inverting voltage amplifying circuit, and the operational amplifier 19, that is a inverting current amplifying circuit, and is provided with the drive arm 101 of the tuning-fork sensor 1 as a frequency selecting element in the loop, and oscillates at the frequency of f0 (Hz) which is close to the series resonance frequency, and the drive arm 101 performs in-plane vibration in the X direction in FIG. 3.

The X direction shown in FIG. 3 is parallel to an electric axis of quartz crystal forming the tuning-fork sensor 1, the Y direction is parallel to a mechanical axis of the quartz crystal, and the Z direction is parallel to an optical axis of the quartz crystal, respectively, but they are sometimes turned by a range of 1 to 10 degrees to obtain the best suited characteristic of not being significantly influenced by temperature.

The operational amplifier 19, that is a inverting current amplifying circuit, converts the alternating current passing through the drive arm 101 of the tuning-fork sensor 1 into the AC voltage to make it an output. That is, a signal voltage S1 of the oscillation frequency f0 (Hz) is generated in the shape of a sine curve shown in FIG. 7 and FIG. 8.

The sensor arm 102 performs in-plane vibration in the X direction in synchronization with the drive arm 101 of the tuning-fork sensor 1. At this time, when the tuning-fork sensor 1 experiences a rotation at an angular velocity ω, in which the vector axis is parallel to the Y direction, a Coriolis force F which is proportional to the angular velocity ω acts in the Z direction orthogonal to the in-plane vibration. The Coriolis force F is expressed as follows.

$$F = 2 \cdot m \cdot \omega \cdot V$$

Here, m is equivalent mass of the drive arm 101 or the sensor arm 102, V is velocity vibrating at the frequency of f0 (Hz).

The out-of-plane vibration having the same frequency of f0 (Hz) as that of the in-plane vibration is excited by the Coriolis force F. Resulting from the vibration, a positive charge and a negative charge are generated alternately in the sensor electrodes 16, 17, and 15, 18 of the sensor arm 102.

Consequently, according to the Coriolis force F which the sensor arm 102 receives, a state in which the positive charge is generated in the sensor electrodes 16 and 17 and the negative charge is generated in the sensor electrodes 15 and 18 of the sensor arm 102, and a state in which the negative charge is generated in the sensor electrodes 16 and 17 and the positive charge is generated in the sensor electrodes 15 and 18, arise alternately.

Here, the operation of the sensor arm 102 and the sensor circuit 6 of the tuning-fork sensor 1 will be explained in detail using FIG. 2.

A mechanical constant at the time when the drive arm 101 and the sensor arm 102 of the tuning-fork sensor 1 vibrate in an out-of-plane vibration at the oscillation frequency of f0 (Hz) by the Coriolis force F is replaced to an electrically equivalent circuit, which is shown as an area within the broken line in FIG. 2.

The equivalent circuit is equivalent to a circuit in which a parallel equivalent capacitor 62 (capacitance value C0) in accordance with an inter-electrode capacitance between the sensor electrodes 16, 17 and the sensor electrodes 15, 18 or their shapes and sizes or the like, and a series circuit consisting of an equivalent inductance 63 (inductance value L1), an equivalent capacitor 64 (capacitance value C1), and an equivalent resistor 65 (resistance value R1) are arranged in parallel.

When the mechanical equivalent mass of the tuning-fork sensor 1 is m, equivalent compliance is c, equivalent viscosity resistance coefficient is r, and a force coefficient, that is a proportionality constant, is A, the relations between them are as follows.

$$L1 = m/A^2 \quad C1 = cA^2 \quad R1 = r/A^2$$

An equivalent electric impedance Z1 evaluated from a parallel equivalent capacitor 62 is as follows in relation to any given frequencies.

$$Z1 = R1 + j(2\pi f \cdot L1 - 1/2\pi f \cdot C0)$$

The reactance X1 is $$X1 = 2\pi f \cdot L1 - 1/2\pi f \cdot C0.$$

Thus, the reactance X1 becomes 0 in relation to the frequency change when the resonance frequency is f1 (Hz) as shown in FIG. 5, and shows an increasing tendency almost proportional to the frequency.

As a concrete embodiment of the tuning-fork sensor, an example of a quartz crystal sensor for a timepiece in which only its thickness is changed will be shown.

The width of the drive arm 101 and the sensor arm 102 in the in-plane vibration direction (the X direction in FIG. 3) of the tuning-fork sensor 1 caused by a quartz crystal sensor is set to 590 μm, the length of each arm is set to 3660 μm, the total length of the tuning-fork sensor 1 is 5900 μm and the thickness is set to 700 μm to bring close the resonance frequency f1 (Hz) of the out-of-plane vibration to the resonance frequency f0(Hz) of the in-plane vibration.

The equivalent circuit constants at a time when the tuning-fork sensor (quartz crystal sensor) performs an out-of-plane vibration in the Z direction in FIG. 3 in a vacuum, are as follows. Equivalent resistance R1=20 kΩ, equivalent capacitance C1=1×10$^{-15}$ F, equivalent inductance L1=23.1×10$^3$H, and the resonance frequency f1 of the out-of-plane vibration is 33 kHz. In the atmosphere, or in inert gas at 1 atmospheric pressure, the equivalent resistance increases to about ten times of R1=200 kΩ.

The frequency difference between the resonance frequency f0 of the in-plane vibration and the resonance frequency f1 of the out-of-plane vibration is to be a detuning frequency Δf=f0−f1. The resonance frequency f0 of the in-plane vibration is varied by electrically adding a passive element to the oscillation circuit 3 shown in FIG. 1 while the resonance frequency f1(Hz) of the out-of-plane vibration remains constant.

Actually, since the length of the supporting member (not shown) supporting the base 103 of the tuning-fork sensor 1 shown in FIG. 3 and FIG. 4 is inversely proportional to the equivalent compliance when the resonance frequency f0(Hz) of the in-plane vibration is constant, it is possible to vary the resonance frequency f1(Hz) of the out-of-plane vibration by changing the length of the supporting member.

While the resonance frequency f1(Hz) of the out-of-plane vibration is kept constant, the resonance frequency f0(Hz) of the in-plane vibration is allowed to change using the passive element, and change of the reactance X1 is checked.

When setting f0=29.7 kHz, the detuning frequency becomes Δf=−f1/10, and the reactance at this time is X1=−1.049×10$^9$ Ω (=−1049 MΩ).

When f0=36.3 kHz, Δf=f1/10, and the reactance X1=0.885×10$^9$ Ω (=885 MΩ).

When setting f0=32.967 kHz, the detuning frequency becomes Δf=−f1/1000, and the reactance at this time is X1=−43×10$^6$ Ω (=−43 MΩ).

When f0=33.033 kHz, Δf=f1/1000, and the reactance X1=40×10$^6$ Ω (=40 MΩ).

Since the equivalent resistance R1 is in the range of 20 kΩ to 200 kΩ, and is very small compared with the reactance X1, the value of the reactance X1 can be the value of the equivalent electric impedance Z1.

Therefore, when f1 is placed at the center and f0 is changed to have the detuning frequency Δf be from Δf=±f1/1000 to Δf=±f1/10, the equivalent electric impedance Z1 is a very large value of 40 MΩ to 1 GΩ.

When the detuning frequency Δf is less than ±f1/1000, the resonance frequency f0(Hz) of the in-plane vibration and the resonance frequency f1(Hz) of the out-of-plane vibration come quite near, and since the Q value becomes high, and velocity change of the sensor arm 102 in relation to a minute change of Δf becomes very large, the detection becomes uncertain. In addition, due to a mechanical joining, the out-of-plane vibration grows even without any angular velocity. When the detuning frequency Δf is more than ±f1/10, the resonance frequency f0 (Hz) of the in-plane vibration and the resonance frequency f1 (Hz) of the out-of-plane vibration are too far away from each other, so that the vibration velocity V of the out-of-plane vibration becomes very small, and the charge generated is limited. Then the sensing output is hardly obtainable.

The input impedance of the operational amplifier 33 shown in FIG. 2 is Rf/(1+A) from the resistance Rf of the feedback resistor 34 when the open-loop gain of the operational amplifier 33 is set to be A. Since the open-loop gain A is more than 100 dB, the input impedance of the operational amplifier 33 becomes very small, and most charge produced in the parallel equivalence capacitor 62 passes into the operational amplifier 33 without passing into the equivalent electric impedance Z1.

An end of the parallel equivalent capacitor 62 of the sensor electrode in the tuning-fork sensor and the positive-input terminal of the operational amplifier 33 are connected to the same ground wire 57. However, the other end of the parallel equivalent capacitor 62 connects to the negative-input terminal.

Accordingly, the negative-input terminal of the operational amplifier 33 is virtually shorted to be at the same potential as that of the positive-input terminal, and both ends of the parallel equivalent capacitor 62 are made equivalently shorted. However, resistance value R1 of an input resistor 66 between the negative-input terminal and the positive-input terminal is very large, and is almost up to infinity. Therefore, equivalent short circuit current Is passes the feedback resistor 34 (resistance value Rf), and the short circuit current Is is converted into voltage, and the output voltage $V_0$=−Rf·Is is generated in the lead wire 58 connected to the output terminal.

Since the resistance value R0 of the output resistor 67 of the operational amplifier 33 is very small, when the voltage drop of this portion is neglected, and conversion coefficient of an internal current source 68 of the operational amplifier 33 is set to be r, the voltage is increased by r·Is=Rf·Is and enters to a state where the parallel equivalent capacitor 62 is short-circuited in a closed loop.

FIG. 6 is a chart in which frequency to gain characteristic is shown in curves 70, 71, 72, and 73 when the equivalent electric impedance Z1 is changed to 1 kΩ, 10 kΩ, 100 kΩ, and 1 MΩ, while the feedback resistance Rf is set to Rf=1 MΩ. The resonance frequency of the tuning-fork sensor (quartz crystal sensor) 1 is around 8 kHz to 40 kHz, and this chart shows that if the equivalent electric impedance Z1 is more than 10 kΩ, a practically satisfactory gain can be obtained.

Here, since the short-circuit current of the sensor electrode of the tuning-fork sensor 1 is as small as several picoamperes. to several microamperes, the operational amplifier 33 requires a very small bias current on the order of several femtoamperes compared with an input current. Accordingly, an FET input operational amplifier or a MOS operational amplifier with low noise is used.

The explanation of operation of the sensor circuit 6 is as above, and the operation of the whole angular velocity sensor device shown in FIG. 1 will be explained with reference to signal waveform diagrams of each section shown in FIG. 7 and FIG. 8.

FIG. 7 is a waveform diagram corresponding to the right turn angular velocity in the Y-axis direction shown in FIG. 3. The output signal S1 of the oscillation circuit 3 has an AC voltage waveform of the resonance frequency f0(Hz), and since the output signal S1 of this voltage waveform is converted to have the same phase as that of the voltage waveform of the output signal Vo of the sensor circuit 6 through the phase-shift circuit 4, it becomes the signal S2 having a voltage waveform to which all is phase-shifted so that the time t=$t_1$ corresponds to the time t=$t_2$. The phase-shift circuit 4 can be put into a stage behind the sensor circuit 6 instead of putting it into a stage behind the oscillation circuit 3, so as to form a structure to phase-shift the sensing signal $V_0$.

On receiving a right-turn angular velocity, the sensor circuit 6 produces the sensing signal Vo having a voltage waveform with peak voltage which is proportional to the angular velocity. The sensing signal Vo is inverted by 180° through the inverting circuit 7 to be an inverted signal V1 of a voltage waveform having the same peak voltage.

The voltage waveform of the output signal S2 of the phase-shift circuit 4 becomes pulse signals S3 and S4 having a voltage waveform different in phase by 180° through the waveform shaping circuit 5. By the pulse signals S3 and S4, the transmission gate 38 of the detector circuit 8 becomes conductive when the pulse signal S3 is in a high level of "H", for instance, during the time $t_2$ to $t_4$ and during the time $t_6$ to $t_8$. Accordingly, only a positive portion of the sensing signal Vo can be output from the transmission gate 38.

The transmission gate 39 of the detector circuit 8 becomes conductive when the pulse signal S4 is in a high level of "H", for instance, during the time $t_1$ to $t_2$ and during the time $t_4$ to $t_6$. Accordingly, only a position portion of the inverted signal V1 can be output from the transmission gate 39.

As a result, from the sensor circuit 8, a detecting output signal V2 shown in FIG. 7 having a voltage waveform in which the above two wave sensing waveforms are composed so that their positive portions are continued, is obtained. The detecting output signal V2, of which AC component is cut by the low-pass filter 9, becomes positive DC output voltage V3 proportional to the angular velocity.

When the tuning-fork sensor 1 receives the left-turn angular velocity in the Y-axis direction, signals of respective portions in FIG. 1 have waveforms shown in FIG. 8. Waveforms of the output signal S1 of the oscillation circuit 3, the output signal S2 of the phase-shift circuit 4, and the waveforms of the pulse signals S3, S4 which are outputted from the waveform shaping circuit 5 are the same as those experienced in the right-turn.

In the case of the left-turn angular velocity, the sensing signal $V_0$ through the sensor circuit 6 shows a voltage waveform in an opposite phase to the phase corresponding to the right-turn angular velocity, with the peak value proportional to the angular velocity.

The sensing signal Vo becomes a inverted signal V1 with the same peak value inverted by 180° through the inverting circuit 7. The inverted signal V1 also shows a voltage waveform in an opposite phase to the phase when it receives the right-turn angular velocity.

By the pulse signals S3 and S4 of the waveform shaping circuit 5, as mentioned for the right-turn, the transmission gate 38 of the detector circuit 8 becomes conductive when the pulse signal S3 is in a high level of "H", for instance, during the time $t_2$ to $t_4$ and during the time $t_6$ to $t_8$. Accordingly, only a negative portion of the sensing signal Vo can be outputted.

The transmission gate 39 of the detector circuit 8 becomes conductive when the pulse signal S4 is in a high level of "H", for instance, during the time $t_1$ to $t_2$ and during the time $t_4$ to $t_6$. Accordingly, only a negative portion of the inverted signal $V_1$ can be outputted.

From the detector circuit 8, a detecting output signal V2 shown in FIG. 7 having a voltage waveform in which the above two are composed so that their negative portions are continued, is obtained. The detecting output signal V2 of which AC component is cut by the low-pass filter 9, becomes negative DC output voltage V3 proportional to the angular velocity.

Thus, the output voltage of the positive direct current proportional to the angular velocity is obtained when in the case of the right-turn angular velocity, and the output voltage of the negative direct current proportional to the angular velocity is obtained in the case of the left-turn angular velocity.

Modification of the First Embodiment

Figure 9:
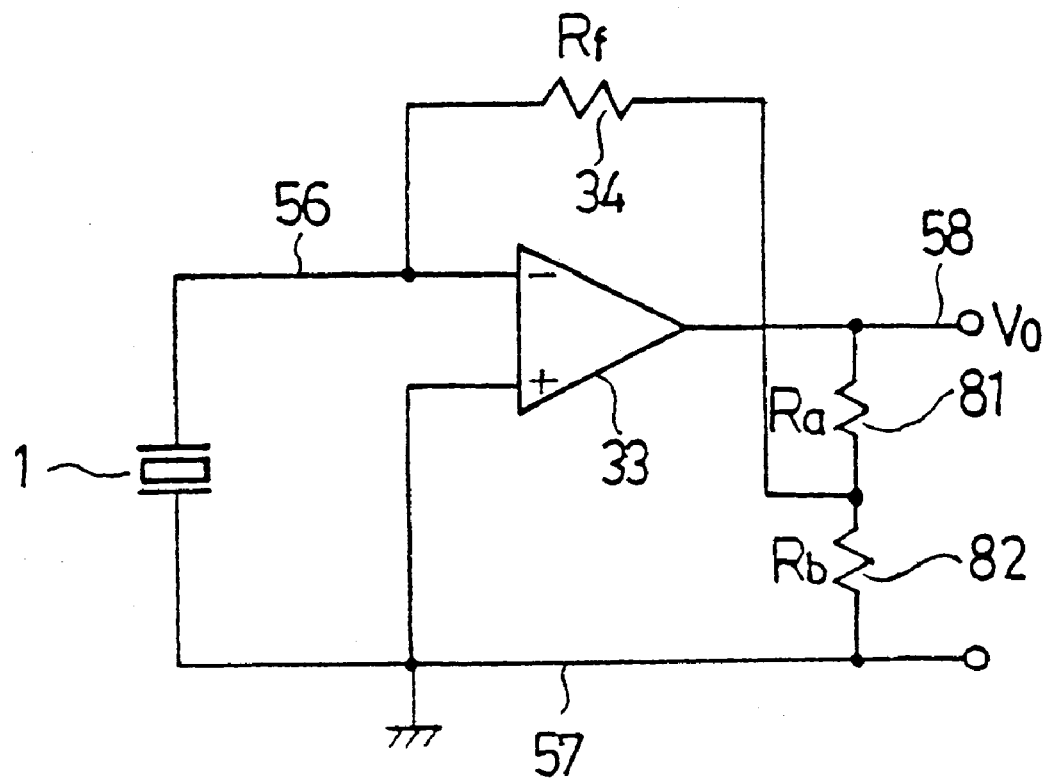
FIG. 9 is a circuit diagram showing a modification of the sensor circuit 6 in the first embodiment of the present invention.

FIG. 9 shows a modification of the sensor circuit 6 in the first embodiment described above.

In this sensor circuit, a series circuit of a first resistor 81 (resistance value Ra) and a second resistor 82 (resistance value Rb) is connected across an output terminal of the operational amplifier 33 and the ground wire 57, and a negative-input terminal and an output terminal of the operational amplifier 33 are connected through the feedback resistor 34 and the first resistor 81. That is, an end of the feedback resistor 34 is connected to the negative-input terminal of the operational amplifier 33, and the other end is connected to a connection point of the first resistor 81 and the second resistor 82.

The output voltage that is a sensing signal $V_0$ of the operational amplifier 33 in this case is $$Vo=-Is \cdot Rf(1+Ra/Rb)$$

where the resistance value of the feedback resistor 34 is Rf, and the value of the feedback current is Is. Thus, even when a feedback resistor 34 having a relatively low resistance value Rf is used, the output voltage is adjustable with a resistance ratio Ra/Rb. When a metal film resistor or the like having a good temperature characteristic is used for a feedback resistor 34, as a resistor having a low resistance value, and resistors having the same temperature characteristic are used for the first resistor 81 and the second resistor 82, a sensor circuit having a very favorable temperature characteristic of not being significantly influenced by temperature can be obtained.

Figure 10:
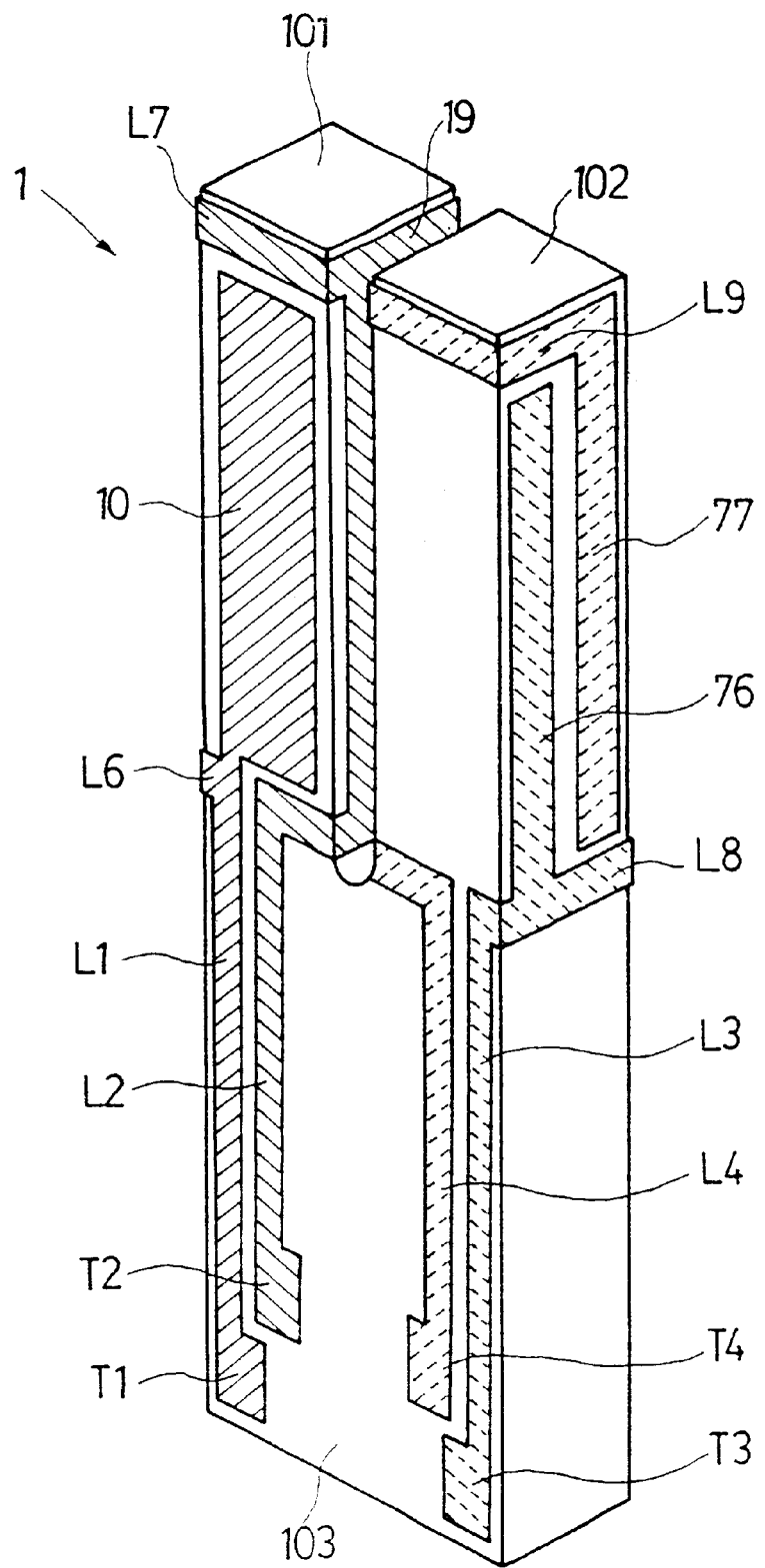
FIG. 10 is a similar perspective view to that in FIG. 3 showing a modification of the tuning-fork sensor of the first embodiment.
Figure 11:
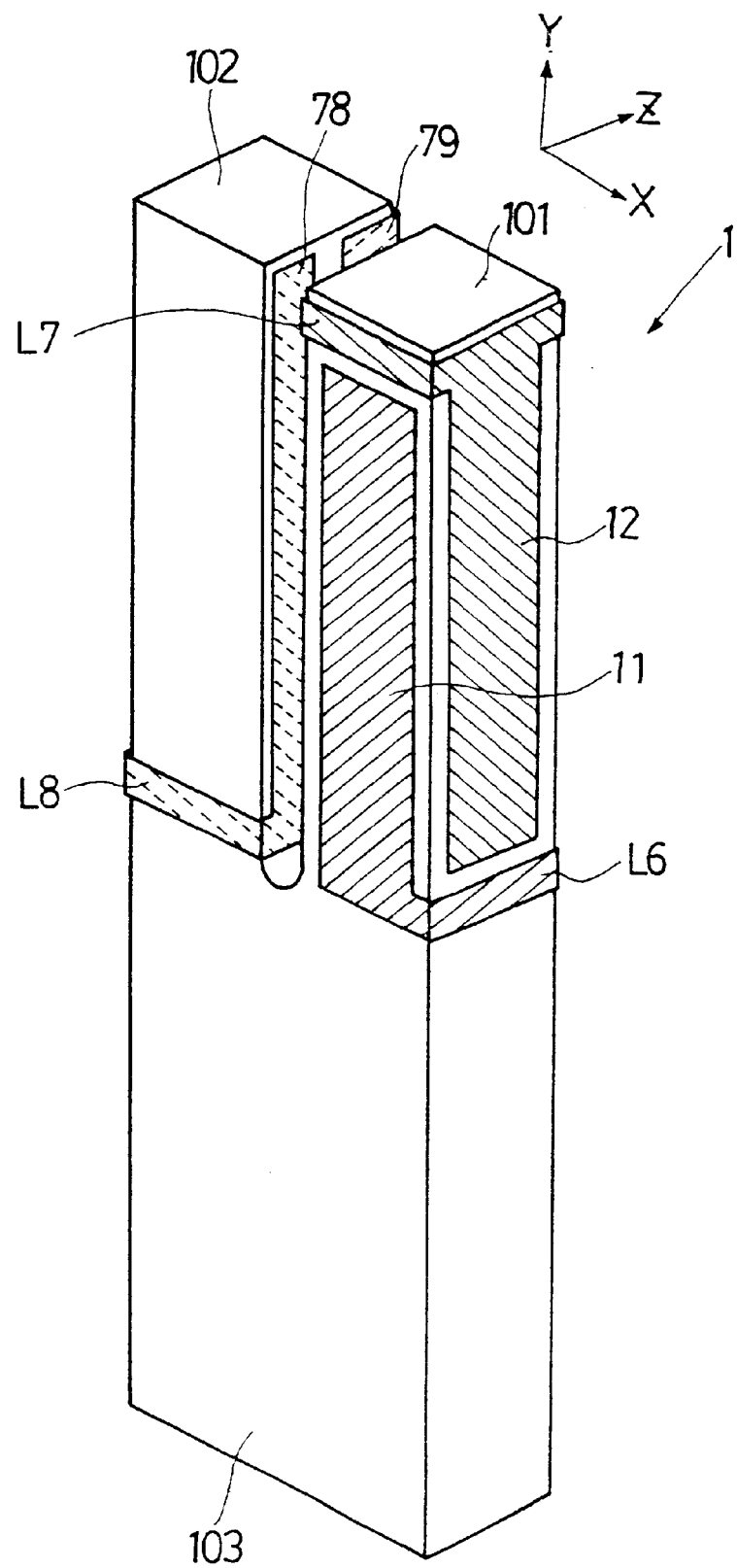
FIG. 11 is a similar perspective view to that in FIG. 4 showing the tuning-fork sensor shown in FIG. 10.

FIG. 10 and FIG. 11 are similar views to FIG. 3 and FIG. 4 showing a modification of the tuning-fork sensor 1. This tuning-fork sensor 1 is also a quartz crystal sensor and the aspect that a drive arm 101, a sensor arm 102 and a base 103 are integrally formed with a quartz crystal plate is the same as for the tuning-fork sensor shown in FIG. 3 and FIG. 4.

The aspect in which this tuning-fork sensor 1 differs from the tuning-fork sensor shown in FIG. 3 and FIG. 4 is only such that one drive electrode 19, out of the drive electrodes formed on the surface of the drive arm 101, is formed instead of the drive electrodes 13 and 14, and sensor electrodes 76, 77 and 78, 79 are formed only on two surfaces parallel to the Z direction as a sensor electrode of the sensor arm 102, and the first sensor electrodes 77, 79 are connected to each other at a connection point L9 and the second electrodes 76, 78 are connected to each other at a connection point L8, respectively.

When this tuning-fork sensor 1 is used, the angular velocity sensing device shown in FIG. 1 can be structured and the same effect as aforementioned is obtained.

In the embodiment explained as above, the in-plane vibration frequency in the X-direction of the tuning-fork sensor (quartz crystal sensor) 1 is set to have a resonance frequency, it is possible that the sensor arm 102 serves as a drive arm, and the drive arm 101 serves as a sensor arm, so that the out-of-plane vibration frequency in the Z direction is set to have a resonance frequency. Similarly, the same effect can be obtained by using a X-cut sensor as a tuning-fork sensor rotated around the Y-axis of the quartz crystal by 90°.

In the above embodiments, quartz crystal is used as the material for the piezoelectric single crystal to form the tuning-fork sensor 1, but other single crystal materials showing piezoelectricity such as lithium tantalate single crystal which is 130° Y-plates, lithium niobate single crystal, and lithium borate single crystal and so on can be used.

Figure 12:
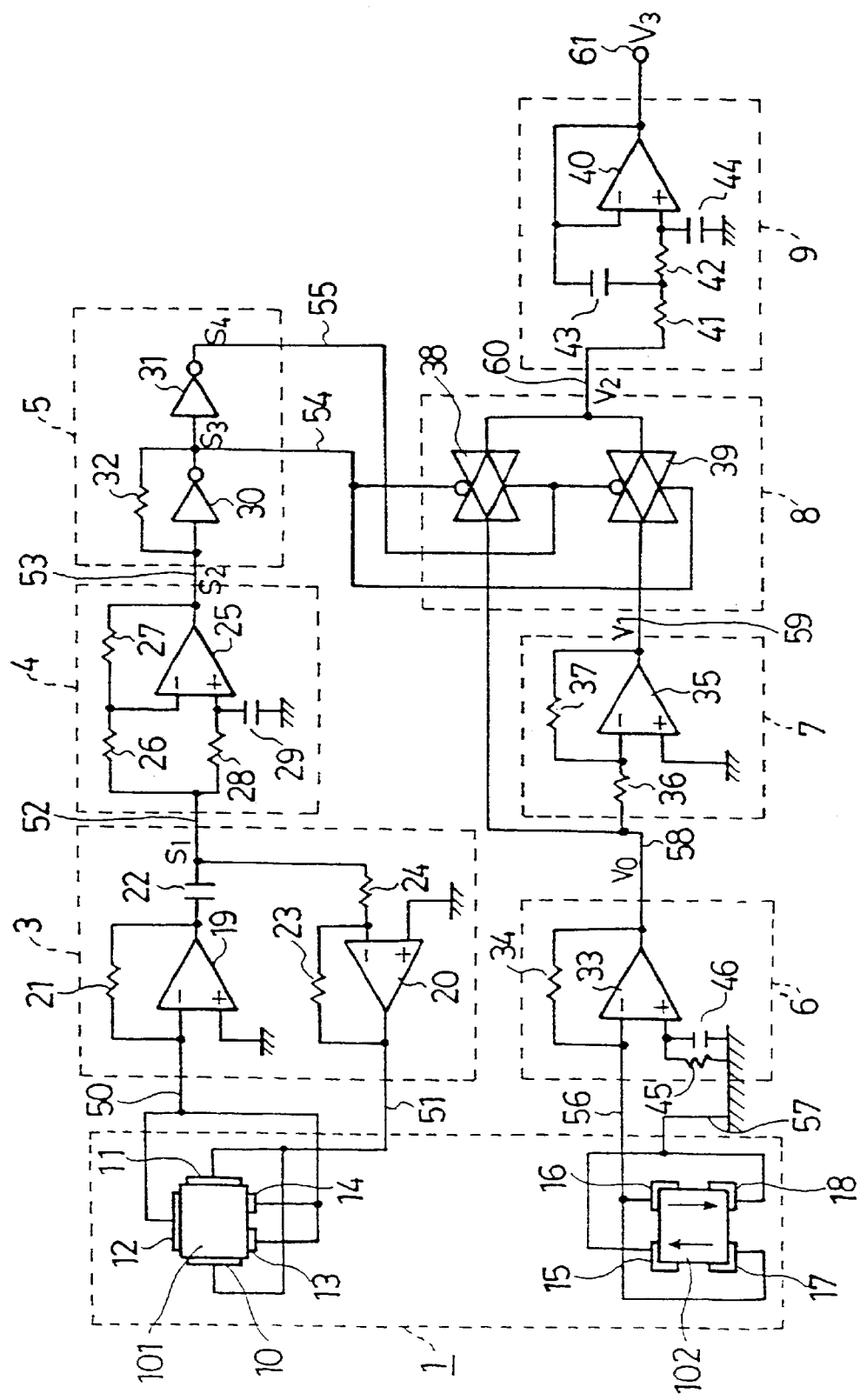
FIG. 12 is a circuit diagram showing the whole structure of a second embodiment of the angular velocity sensing device of the present invention.
Figure 13:
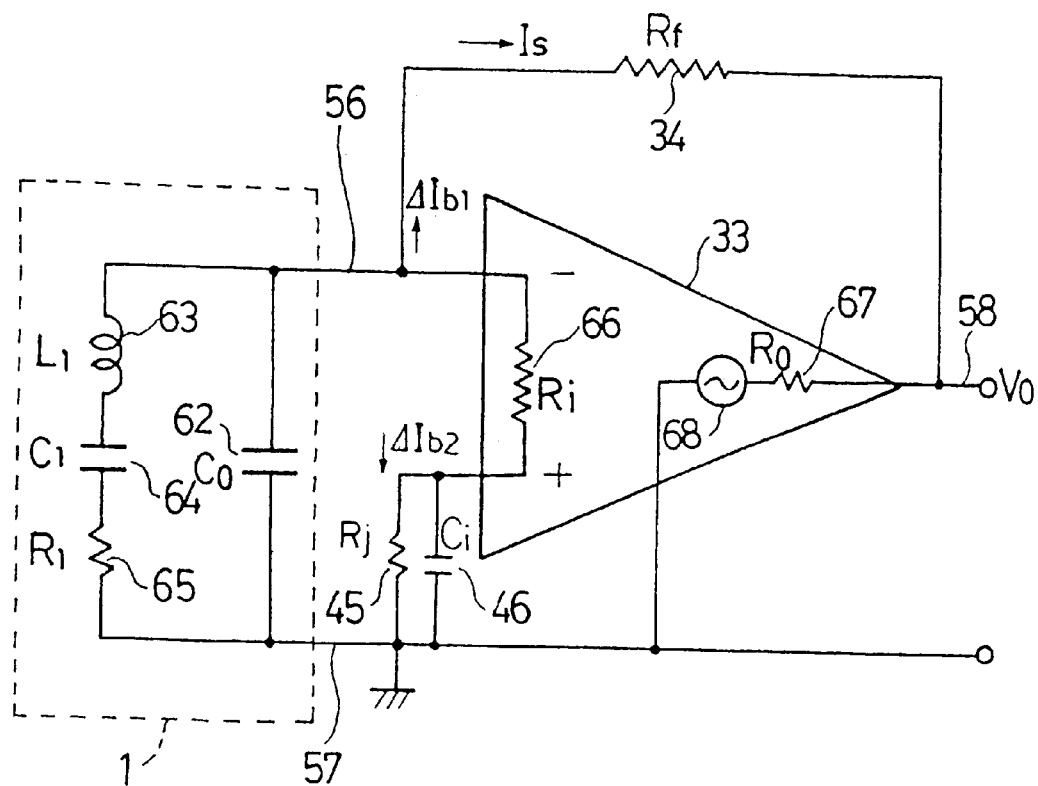
FIG. 13 is a circuit diagram to explain the principle of operation of an equivalent circuit and a sensor circuit of the tuning-fork sensor according to the second embodiment.
Figure 14:
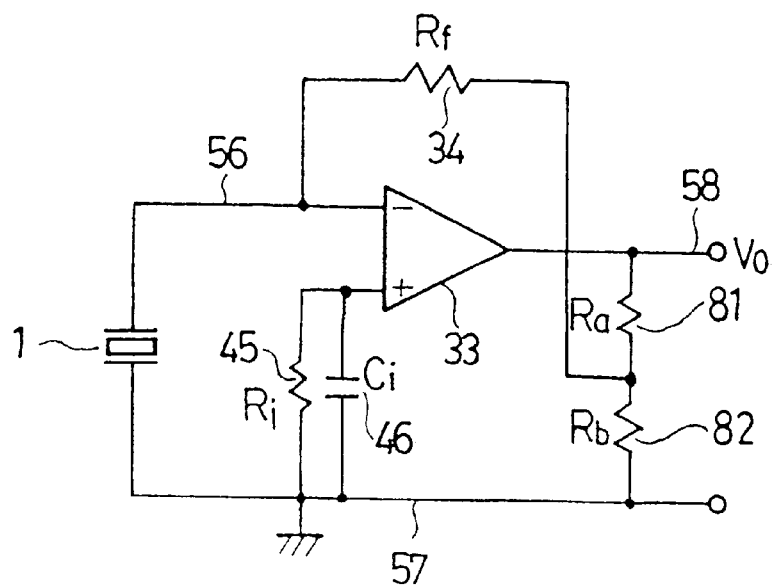
FIG. 14 is a circuit diagram showing a modification of a sensor circuit 6' in the second embodiment of the present invention.

Second Embodiment: FIG. 12 to FIG. 14

Next, the second embodiment of the angular velocity sensing device of the present invention will be explained with reference to FIG. 12 and FIG. 14. FIG. 12 is a circuit diagram showing the whole structure of the angular velocity sensing device, excepting a sensor circuit 6'. Since all of a tuning sensor 1 and each of circuits 3 to 5 and 7 to 9 are the same as those in the angular velocity sensing device in the first embodiment shown in FIG. 1, the explanation for them will be omitted.

The sensor circuit 6' in the angular velocity sensing device is structured in such a manner that a positive-input terminal of an operational amplifier 33 is connected to a ground wire 57 through a parallel circuit of a resistor 45 and a capacitor 46, second sensor electrodes 16, 17 of a sensor arm of the tuning-fork sensor 1 and a negative-input terminal of the operational amplifier 33 are connected to each other, and a negative-input terminal and an output terminal of the operational amplifier 33 are connected to each other through a feedback resistor 34.

The effect of the sensor circuit 6' will be explained with an equivalent circuit diagram shown in FIG. 13.

In the sensor circuit 6', the resistor 45 (resistance value Ri) and the capacitor 46 (capacitance value Ci) connected in parallel across the positive-input terminal of the operational amplifier 33 and the ground wire 57 compensate the input bias current change caused by the temperature of the operational amplifier 33. Without resistor 45, when the input bias current of the negative-input terminal of the operational amplifier 33 is increased by $\Delta Ib_1$, output voltage becomes $Vo=-(Is+\Delta Ib_1) Rf$, and the output voltage changes only by $-\Delta Ib_1 \cdot Rf$.

If the input bias current of the positive-input terminal changes $\Delta Ib_2$, voltage of the positive-input terminal increases by $\Delta Ib_2 \cdot Rs$. Accordingly, if the resistance value Rs of the resistor 45 is selected so as to be $\Delta Ib_1 \cdot Rf=\Delta Ib_2 \cdot Rs$, the output voltage of the operational amplifier 33 becomes $Is \cdot Rf$, so that the fluctuation can be suppressed.

Most noise components can be removed by bypassing with the capacitor 46. In general, the operational amplifier 33 can be structured so that the input bias current $\Delta Ib_1$ and $\Delta Ib_2$ are equal to each other. Accordingly, it is satisfactory that the resistance value Ri of the resistor 45 is made equal to the resistance value Rf of the feedback resistor 34.

FIG. 14 shows a modification of the sensor circuit 6', and similar to the modification of the first embodiment shown in FIG. 9, a series circuit of a first resistor 81 (resistance value Ra) and a second resistor 82 (resistance value Rb) are connected across an output terminal of the operational amplifier 33 and the ground wire 57, and a negative-input terminal and an output terminal of the operational amplifier 33 are connected to each other through a feedback resistor and the first resistor 81. That is, one end of the feedback resistor 34 is connected to a negative-input terminal of the operational amplifier 33, and the other end is connected to a connection point of the first resistor 81 and the second resistor 82.

An output voltage of the operational amplifier 33 in this case, that is a sensing signal Vo is also $$Vo = -Is \cdot Rf(1+Ra/Rb)$$

where the resistance value of the feedback resistor 34 is Rf, and the value of the feedback current is Is. Accordingly, even when a feedback resistor 34 having a relatively low resistance value Rf is used, output voltage is adjustable with a resistance ratio Ra/Rb. When a metal film resistor or the like having a good temperature characteristic is used as a resistor having a low resistance value for a feedback resistor 34, and resistors having the same temperature characteristic are used for the first resistor 81 and the second resistor 82, a sensor circuit having a very favorable characteristic of not being significantly influenced by temperature can be obtained.

The same as in the case of the first embodiment, the equivalent resistance or the equivalent electric impedance between the first sensor electrodes 15, 18 and the second sensor electrodes 16, 17 of the sensor arm 102 of the tuning-fork sensor 1 is preferably more than 10 kΩ.

Also as in the case of the first embodiment, when a resonance frequency of the self-excited vibration of the drive arm 101 of the tuning-fork sensor 1 is f0(Hz), and a resonance frequency of the vibration in the direction orthogonal to the vibration direction of the self-excited vibration of the drive arm 101 in the sensor arm 102 is f1(Hz), the value of a detuning frequency $\Delta f = f0-f1$ between the resonance frequency f0(Hz) of the drive arm 101 and the resonance frequency f1(Hz) of the sensor arm 102 is preferably between f1/1000 and f1/10 or between -f1/1000 and -f1/10.

Figure 15:
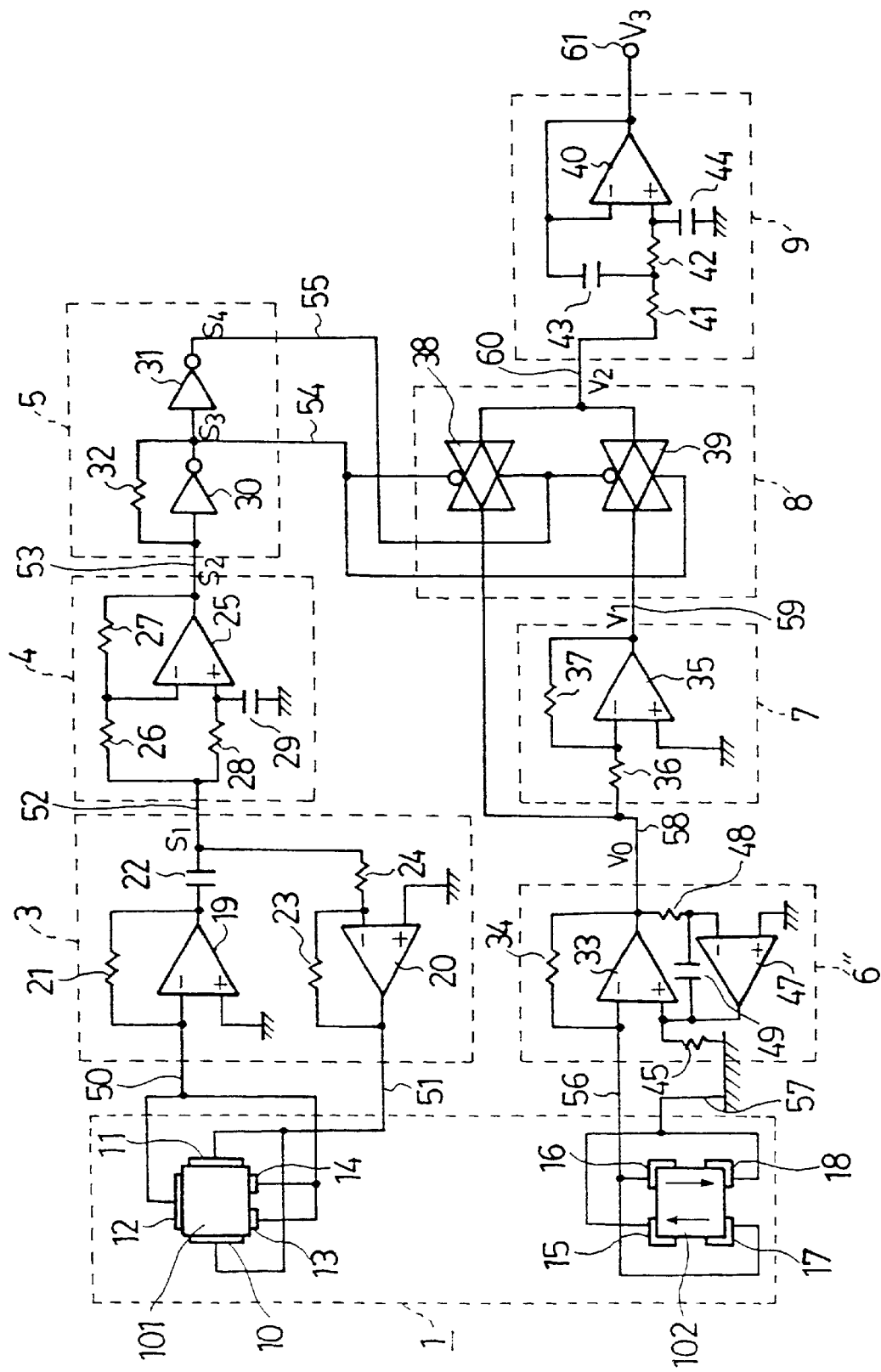
FIG. 15 is a circuit diagram showing the whole structure of a third embodiment of the angular velocity sensing device of the present invention.
Figure 16:
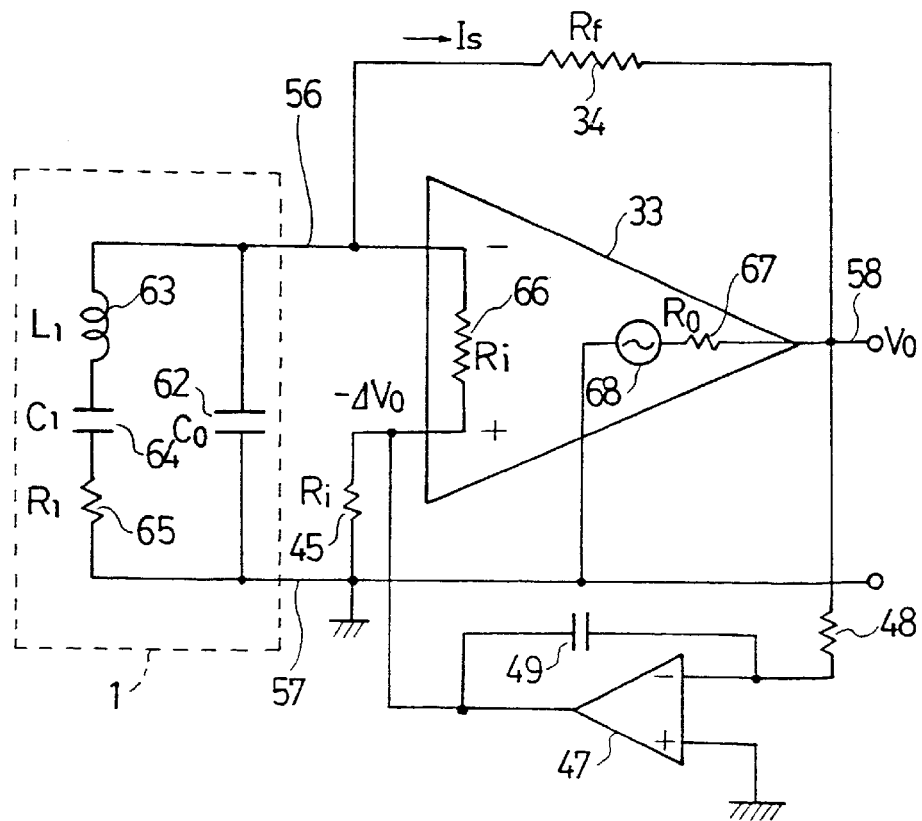
FIG. 16 is a circuit diagram to explain the principle of operation of an equivalent circuit and a sensor circuit of the tuning-fork sensor according to the third embodiment.
Figure 17:
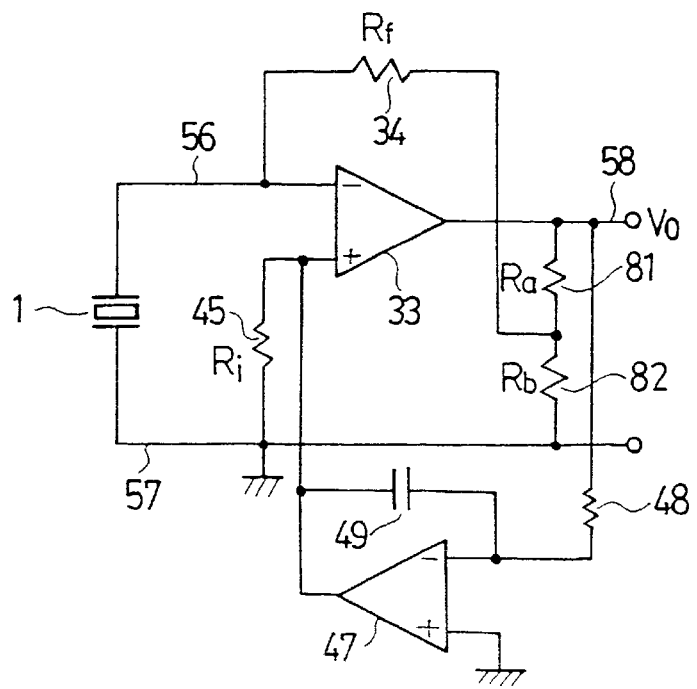
FIG. 17 is a circuit diagram showing a modification of a sensor circuit 6" in the third embodiment of the present invention.

Third Embodiment: FIG. 15 to FIG. 17

Next, the third embodiment of the angular velocity sensing device of the present invention will be explained with reference to FIG. 15 to FIG. 17.

FIG. 15 is a circuit diagram showing the whole structure of the angular velocity sensing device. Since all of a tuning sensor 1 and each circuit 3 to 5 and 7 to 9 are the same as those in the angular velocity sensing device in the first embodiment shown in FIG. 1, excepting a sensor circuit 6", the explanation for them will be omitted.

The sensor circuit 6" in the angular velocity sensing device is structured in such a manner that a positive-input terminal of an operational amplifier 33 is connected to a ground wire 57 through a resistor 45, second sensor electrodes 16, 17 formed on a sensor arm 102 of the tuning-fork sensor 1 and a negative-input terminal of the operational amplifier 33 are connected to each other, and the negative-input terminal and an output terminal of the operational amplifier 33 are connected to each other through a feedback resistor. The output terminal and the positive-input terminal of the operational amplifier 33 are connected to each other through an integrating circuit. The integrating circuit is comprised of an operational amplifier 47, a resistor 48, and a capacitor 49.

The operational amplifier 47 forming the integrating circuit connects its positive-input terminal to the ground wire 57, the negative-input terminal is connected to the output terminal of the operational amplifier 33 through the resistor 48, and the capacitor 49 is connected across the negative-input terminal and the output terminal.

The operation of the sensor circuit 6" will be explained with an equivalent circuit diagram shown in FIG. 16.

In the sensor circuit 6", the integrating circuit between the output terminal and the positive-input terminal of the operational amplifier 33 compensates an offset-drift fluctuation of the output voltage (sensing signal) Vo of the sensor circuit 6".

That is, the integrating circuit inverts the DC offset voltage of the sensor circuit 6" and feed it backs into the positive-input terminal of the operational amplifier 33, so as to control the DC output component to be zero.

The cut-off frequency fc at this time becomes $fc = \frac{1}{2}\pi R2 \cdot C2$, where the resistance value of the resistor 48 is R2 and the capacitance value of the capacitor 49 is C2. The resistance value R2 of the resistor 48 and the capacitance value C2 of the capacitor 49 are set in such a manner that the fc becomes sufficiently lower than the resonance frequency f0.

Since the output of the integrating circuit of the AC frequency above the cut-off frequency fc attenuates into zero, in the resonance frequency f0, the output voltage Vo of the sensor circuit 6" is $-Rf \cdot Is$ with no effect due to the integrating circuit.

FIG. 17 is a modification of the sensor circuit 6", and similar to the modification of the first embodiment shown in FIG. 9, a series circuit of a first resistor 81 (resistance value Ra) and a second resistor 82 (resistance value Rb) are connected between an output terminal of the operational amplifier 33 and the ground wire 57, and a negative-input terminal and an output terminal of the operational amplifier 33 are connected to each other through a feedback resistor and the first resistor 81. That is, one end of the feedback resistor 34 is connected to a negative-input terminal of the operational amplifier 33, and the other end is connected to a connection point of the first resistor 81 and the second resistor 82.

An output voltage, that is a sensing signal $V_0$, of the operational amplifier 33 in this case is also $$Vo = -Is \cdot Rf(1+Ra/Rb)$$

where the resistance value of the feedback resistor 34 is Rf, and the value of the feedback current is Is. Accordingly, even when a feedback resistor 34 having a relatively low resistance value Rf is used, the output voltage is adjustable with a resistance ratio Ra/Rb. When a metal film resistor and the like having a good temperature characteristic is used as a resistor having a low resistance value for a feedback resistor 34, and resistors having the same temperature characteristic are used for the first resistor 81 and the second resistor 82, a sensor circuit having a very favorable characteristic of not being significant influenced temperature can be obtained.

The same as in the case of the first embodiment, the equivalent resistance or the equivalent electric impedance between the first sensor electrodes 15, 18 and the second sensor electrodes 16, 17 on the sensor arm 102 of the tuning-fork sensor 1 is preferably more than 10 kΩ.

Figure 18:
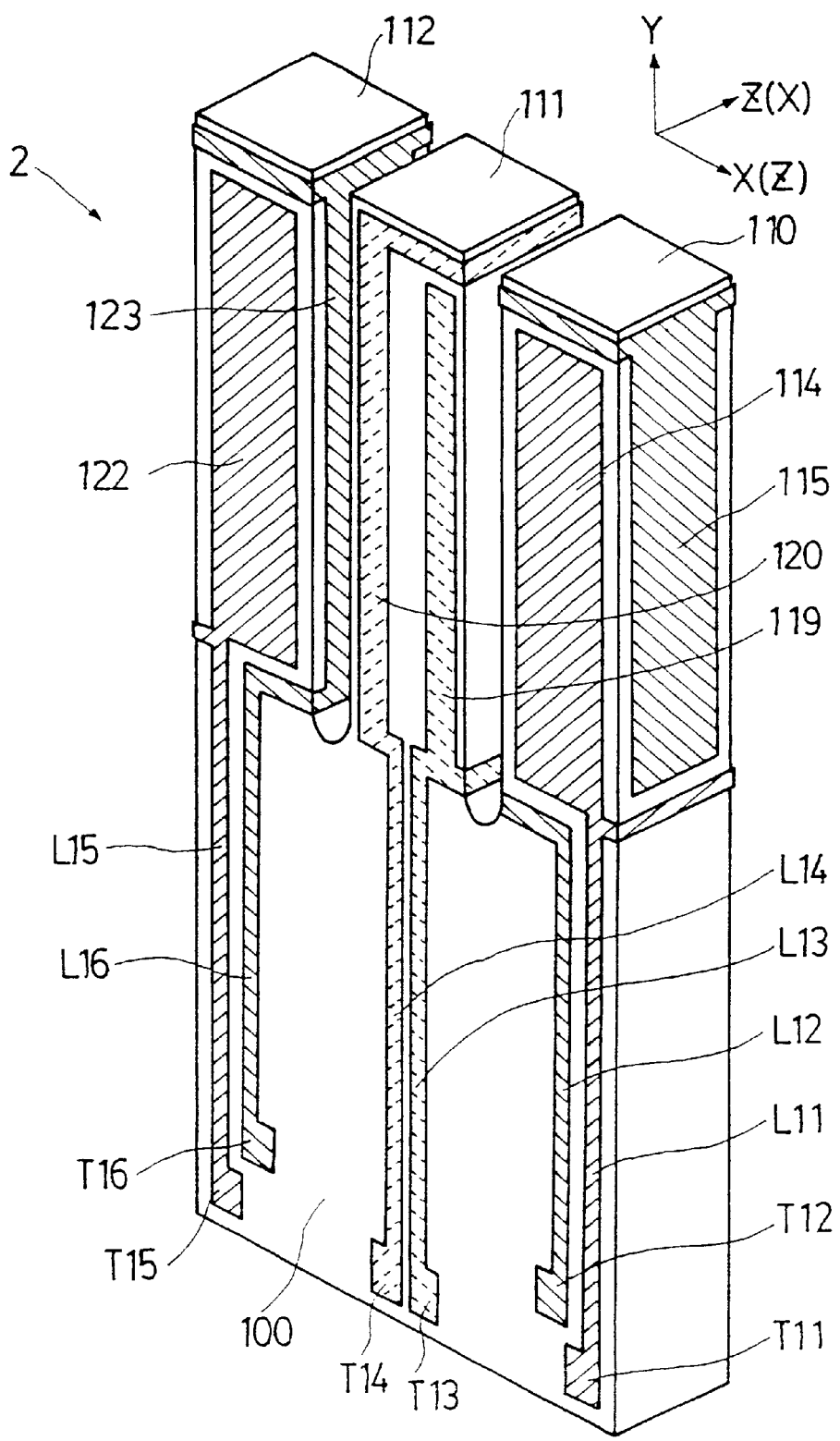
FIG. 18 is a perspective view showing an outward appearance of a three-forked tuning sensor used in a fourth to sixth embodiments of the angular velocity sensing device of the present invention, seen from the front right side at an angle.
Figure 19:
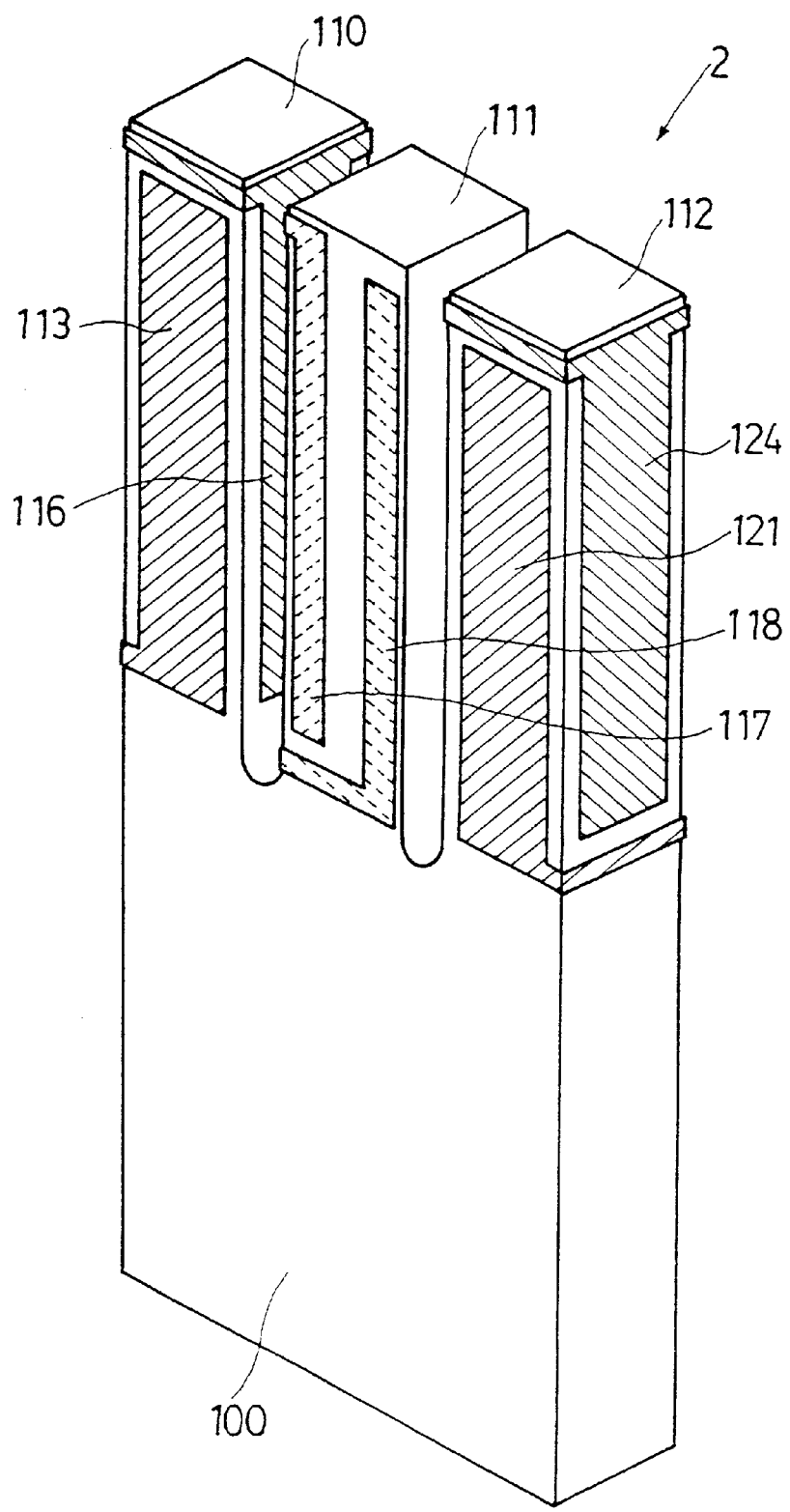
FIG. 19 is a perspective view of the sensor in FIG. 18 seen from the back right side at an angle.
Figure 20:
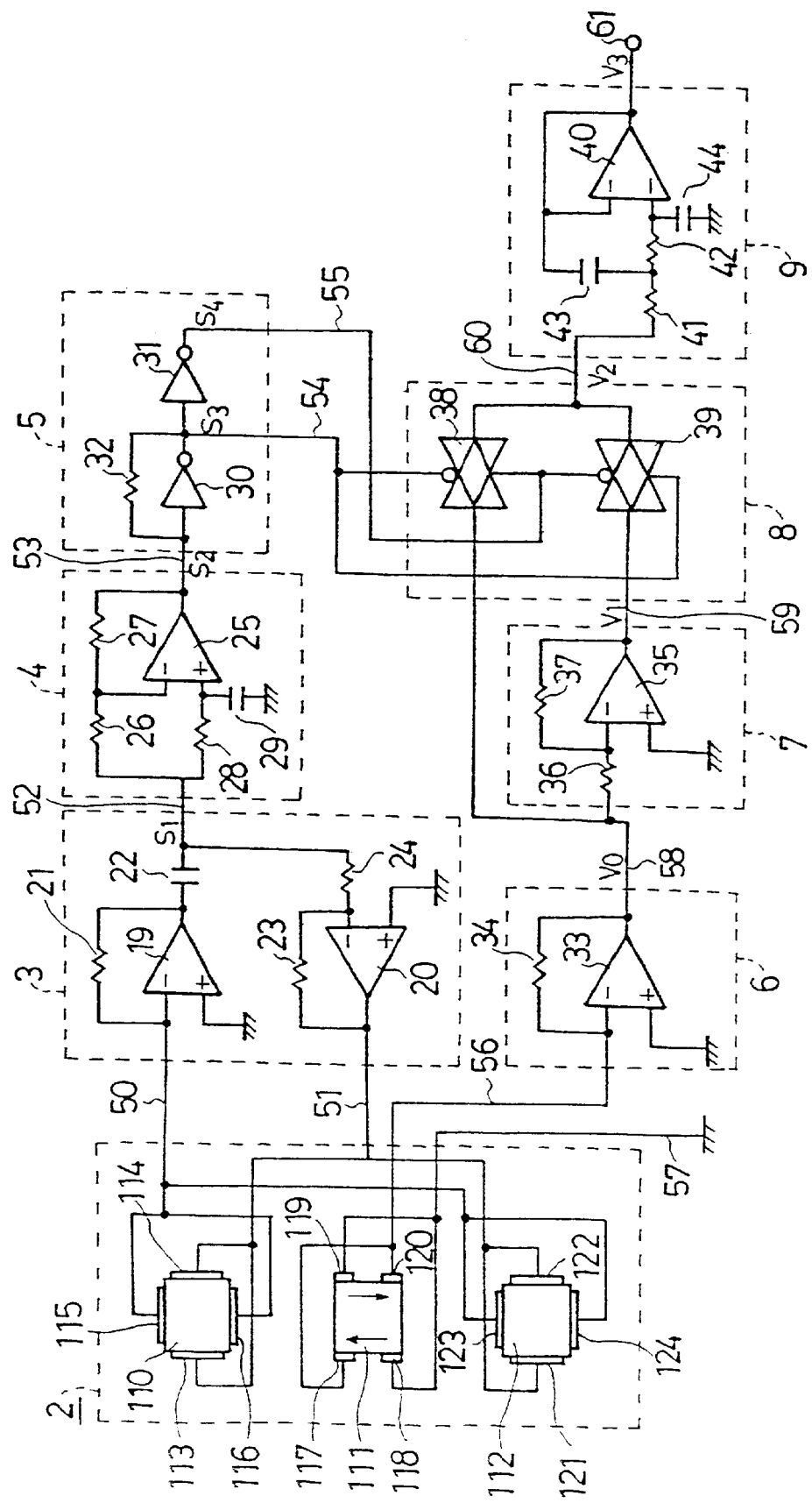
FIG. 20 is a circuit diagram showing the whole structure of a fourth embodiment of the angular velocity sensing device of the present invention.

Also as in the case of the first embodiment, when a resonance frequency of the self-excited vibration of the drive arm 101 of the tuning-fork sensor 1 is f0(Hz), and a resonance frequency of vibration in the direction orthogonal to the vibration direction of the self-excited vibration of the drive arm 101 in the sensor arm 102 is f1(Hz), the value of a detuning frequency Δf=f0−f1 between the resonance frequency f0(Hz) of the drive arm 101 and the resonance frequency f1 (Hz) of the sensor arm 102 is preferably between f1/1000 and f1/10 or between −f1/1000 and −f1/10.
Fourth embodiment: FIG. 18 to FIG. 20
In each embodiment described above, examples in which the tuning-fork sensor is used as a sensor is explained, but the sensor is not limited to this; a sensor which has at least one piece of driving arm and at least one piece of sensor arm is acceptable.

Next, an embodiment of the angular velocity sensing device using a three-forked tuning sensor as a sensor will be explained.

FIG. 18 and FIG. 19 are perspective views of the three-forked tuning sensor seen from the front side and from the back side.

The three-forked tuning sensor 2 is also a quartz crystal sensor, and is formed of quartz crystal plate, that is a piezoelectric crystalline material, by mechanical processing such as by a wire saw, or by chemical processing such as etching.

The three-forked tuning sensor 2 is comprised of three pieces of arms which comprise two pieces of drive arms 110, 112, and one piece of sensor arm 111, and a base 100 on with these three arms 110, 112, and 111 are provided in parallel to each other. The two drive arms 110 and 112 are disposed on both ends in the X direction shown in FIG. 18, and the sensor arm 111 is disposed at the center thereof, and all extend in the Y direction. The base 100 is supported by a supporting member (not shown).

In FIG. 18, the X direction is almost parallel to the electrical axis of the quartz crystal, the Y direction to the mechanical axis of the quartz crystal, and Z direction to the optical axis of the quartz crystal, but in order to obtain the best characteristic of not being significant influenced temperature, it is sometimes turned by 1 to 10 degrees.

In FIGS. 18 and 19, the example of a Z-cut sensor in which the optical axis direction, that is the Z direction, of the quartz crystal is cut, is shown, but it is possible to get the same effect by using an X-cut sensor in which the direction of the electrical axis is cut.

The drive arms 110 and 112 have square pillar shapes, and the respective side faces of the drive arm 110 have drive electrodes 113, 114, 115 and 116, and the respective side faces of the drive arm 112 have drive electrodes 121, 122, 123, and 124. These drive arms 110 and 112 are arms which self-excitedly vibrate at a resonance frequency in the X direction (in-plane direction).

The sensor arm 111 is an arm which also has a square pillar shape, and has first sensor electrodes 118, 119 and second sensor electrodes 117, 120 on two opposite side faces, and vibrate in synchronization with the drive arms 110 and 112 in the same X direction as that of the drive arms. The arms are forced to vibrate by a Coriolis force induced by the rotation at the same frequency as the resonance frequency of the drive arm in the Z direction which is orthogonal to the vibration direction of the self-excited vibration.

These respective drive electrodes from 113 to 116, from 121 to 124, and sensor electrodes from 117 to 120 are formed by a metal film forming process such as vacuum vapor deposition and sputtering.

The drive electrodes 113 and 114 provided on the opposite surfaces of the drive arm 110 are connected to each other on the drive arm 110, and are connected to a terminal T1 provided at the lower portion of the base 110 through a leading portion L11. Similarly, the drive electrodes 115 and 116 formed on the other opposite surfaces of the drive arm 110 are connected to each other on the drive arm 110, and are connected to a terminal T12 through a leading portion L12.

The drive electrodes 121 and 122 provided on the opposite surfaces of the drive arm 112 are connected to each other on the drive arm 112, and are connected to a terminal T15 provided at the lower portion of the base 100 through a leading portion L15. Similarly, the drive electrodes 123 and 124 formed on the other opposite surfaces of the drive arm 112 are connected to each other on the drive arm 112, and are connected to a terminal T16 through a leading portion L16.

The first sensor electrodes 118 and 119 provided on the opposite surfaces of the sensor arm 111 are connected to each other on the sensor arm 111, and are connected to a terminal T13 provided at the lower portion of the base 100 through a leading portion L13. Similarly, the sensor electrodes 117 and 120 formed on the same opposite surfaces of the sensor arm 111 are connected to each other on the sensor arm 111, and are connected to a terminal T14 through a leading portion L14.

As a concrete example of the size of the three-forked tuning sensor 2, the drive arms 110 and 112 vibrating in plane (the X direction) and the sensor arm 111 are respectively set to 600 μm in width, 3700 μm in length, and the sensor 2 is set to 5900 μm in total length, 2200 μm in total width, and 600 μm in thickness so as to bring the resonance frequency f1 (Hz) of the out-of-plane vibration (in the Z direction) close to the resonance frequency f0 (Hz) of the in-plane vibration.

FIG. 20 is a circuit diagram showing the whole structure of the fourth embodiment of the angular velocity sensing device according to the present invention. Since it is the same as the first embodiment explained with FIG. 1, except that the above-described three-forked tuning sensor 2 is used in place of the tuning-fork sensor 1 in FIG. 1, the detailed explanation thereof will be omitted.

In the three-forked tuning sensor 2, the drive electrodes 113, 114 and 121, 122 provided on two drive arms 110 and 112 are brought together to connect to an output terminal of the operational amplifier 20 of the oscillation circuit 3 through a lead wire 51, and the drive electrodes 115, 116 and 123, 124 are brought together and connected to a negative-input terminal of the operational amplifier 19 of the oscillation circuit 3 through a lead wire 50.

The first sensor electrodes 118 and 119 provided on the sensor arm 111 are connected to a ground wire 57, and the second sensor electrodes 117 and 120 are connected to a negative-input terminal of the operational amplifier 33 of the sensor circuit 6 through a lead wire 56.

The structure in which a sensor circuit 6 is formed by connecting a positive-input terminal of the operational amplifier 33 to the ground wire 57, and connecting the negative-input terminal and the output terminal to each other through a feedback resistor 34, is the same as in the first embodiment.

This angular velocity sensing device acts in the same manner as in the case of the first embodiment, and direct current voltage with a polarity according to the direction of the angular velocity resulting from the rotation which the three-forked tuning sensor 2 experiences, and with an absolute value depending on amplitude of the angular velocity, is obtained from the output terminal of the low-pass filter 9.

Alternatively, the sensor circuit 6 is modified as shown in FIG. 9, (except that the three-forked tuning sensor 2 is connected instead of the tuning-fork sensor 1), a series circuit of a first resistor 81 (resistance value Ra) and a second resistor 82 (resistance value Rb) is connected across the output terminal of the operational amplifier 33 and the ground wire 57, and the negative-input terminal and the output terminal of the operational amplifier 33 may be connected to each other through the feedback resistor 34 and the resistor 81.

Through this configuration, a sensor circuit having a favorable characteristic of not being significantly influenced by temperature can be realized.

It should be noted that the drive arms 110 and 112 of the three-forked tuning sensor 2 are used for a sensor arm, and the sensor arm 111 is used for a drive arm, so as to set the out-of-plane frequency in the Z direction in FIG. 18 to be a resonance frequency.

The same thing can be achieved when the three-forked tuning sensor 2 is made of an X-cut sensor which is rotated around the Y-axis of the quartz crystal by 90°.

In the above embodiments, quartz crystal is used as the material for the piezoelectric single crystal to form the three-forked tuning sensor 2, but other single crystal materials showing piezoelectricity such as lithium tantalate single crystal which is 130° Y-plates, lithium niobate single crystal, and lithium borate single crystal, can be used.

It is desirable that equivalent resistance or equivalent electric impedance between the first sensor electrodes 118, 119 and the second sensor electrodes 117, 120 of the sensor arm 111 of the three-forked tuning sensor 2 is more than 10 kΩ.

As in the case of the first embodiment to the third embodiment, when the resonance frequency of the self-excited vibration of the drive arms 110, 112 of the three-forked tuning sensor 2 is f0(Hz), and the resonance frequency of vibration in the direction orthogonal to the vibration direction of the self-excited vibration of the drive arm in the sensor arm 111 is f1(Hz), the value of the detuning frequency $\Delta f = f0-f1$ between the resonance frequency f0(Hz) of the drive arm and the resonance frequency f1(Hz) of the sensor arm is preferably between f1/1000 and f1/10 or between −f1/1000 and −f1/10.

As for these matters, the same is the following case for the fifth and sixth embodiments.

Figure 21:
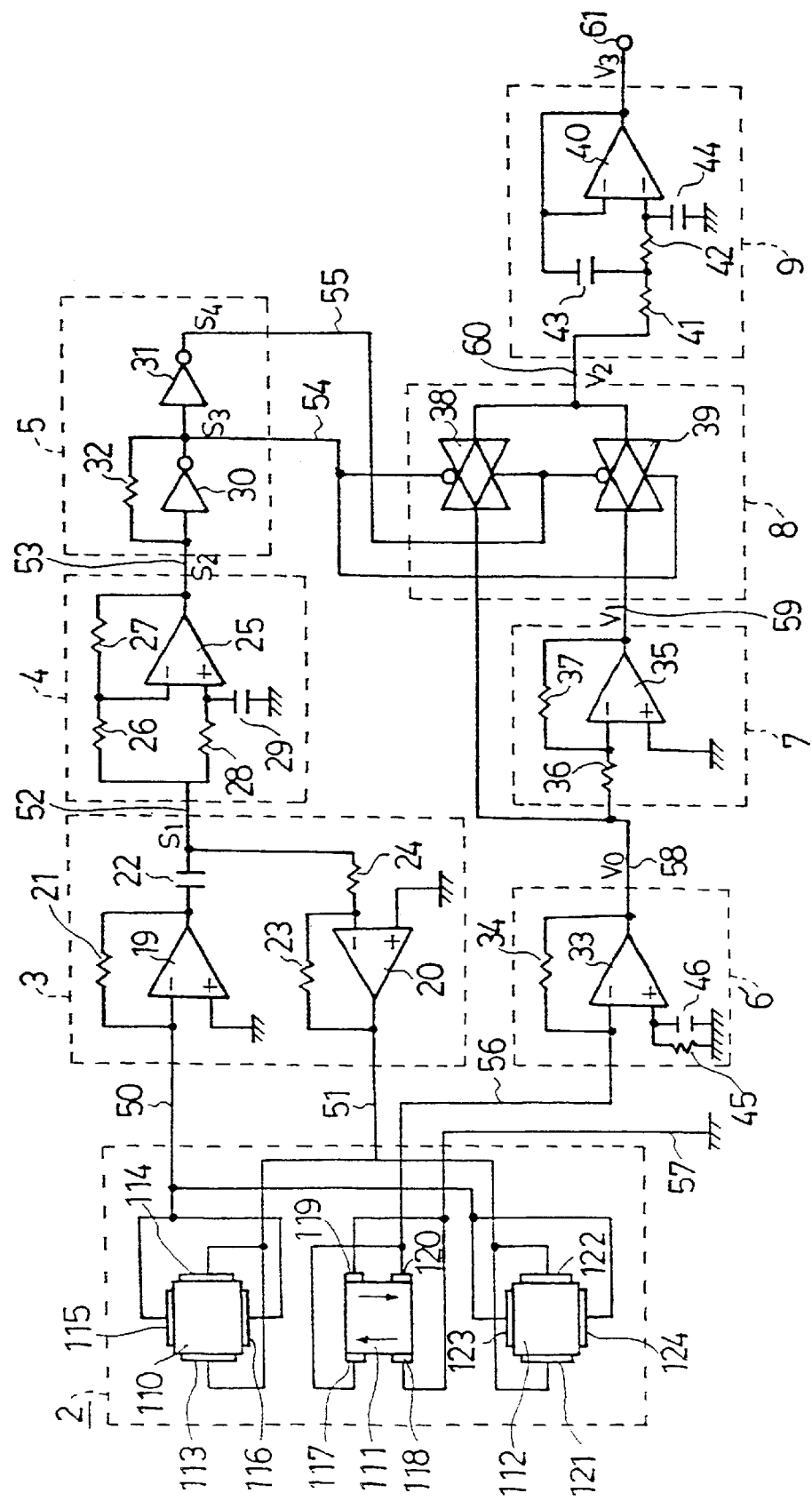
FIG. 21 is a circuit diagram showing the whole structure of a fifth embodiment of the angular velocity sensing device of the present invention.

Fifth Embodiment: FIG. 21

Next, the fifth embodiment of the angular velocity sensing device according to the present invention will be explained.

FIG. 21 is a circuit diagram showing the whole structure of the angular velocity sensing device. The angular velocity sensing device of the present embodiment differs from that of the fourth embodiment shown in FIG. 20 only in a point of the sensor circuit 6', and differs from the second embodiment shown in FIG. 12 only in such that a three-forked tuning sensor 2 similar to that in the fourth embodiment described above is used in place of the tuning-fork sensor 1, and since the effect of the sensor circuit 6' is the same as that explained with FIG. 13, the explanation thereof will be omitted.

It should be noted that the angular velocity sensing device in the fifth embodiment has a special feature in that a three-forked tuning sensor 2 is used for a sensor, and in the sensor circuit 6', a positive-input terminal of an operational amplifier 33 is connected to a ground wire 57 through a parallel circuit of a resistor 45 and a capacitor 46.

Also in this case, the sensor circuit 6' can be changed to a circuit shown in FIG. 14. The effect due to the change is the same as explained with reference to FIG. 14.

Figure 22:
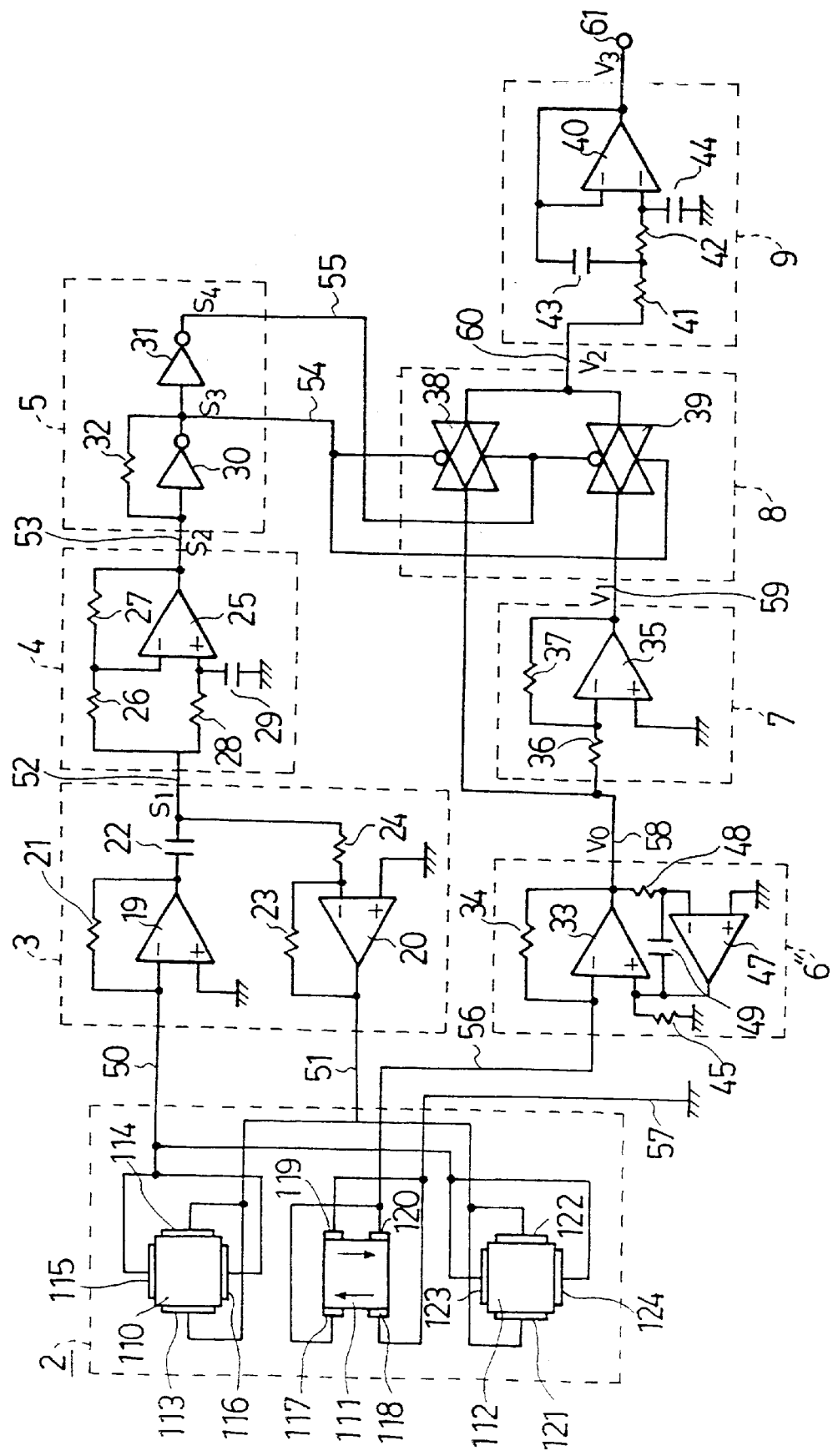
FIG. 22 is a circuit diagram showing the whole structure of a sixth embodiment of the angular velocity sensing device of the present invention.

Sixth Embodiment: FIG. 22

Next, the sixth embodiment of the angular velocity sensing device according to the present invention will be explained.

FIG. 22 is a circuit diagram showing the whole structure of the angular velocity sensing device. The angular velocity sensing device of the present embodiment differs from that of the above-described fourth embodiment shown in FIG. 20 only in a point of the sensor circuit 6", and differs from the third embodiment shown in FIG. 15 only in that a three-forked tuning sensor 2 similar to that in the fourth embodiment described above is used in place of the tuning-fork sensor 1, and since the effect of the sensor circuit 6" is the same as that explained with reference to FIG. 16, the explanation thereof will be omitted.

It should be noted that the angular velocity sensing device in the sixth embodiment has a special feature in that a three-forked tuning sensor 2 is used for a sensor, and in the sensor circuit 6", a positive-input terminal of an operational amplifier 33 is connected to a ground wire 57 through a resistor 45, and the positive-input terminal and an output terminal of the operational amplifier 33 are connected to each other through an integrating circuit composed of a operational amplifier 47, a resistor 48 and a capacitor 49.

Also in this case, the sensor circuit 6" can be changed to a circuit shown in FIG. 17. The effect due to the change is the same as explained with FIG. 17.

Figure 23:
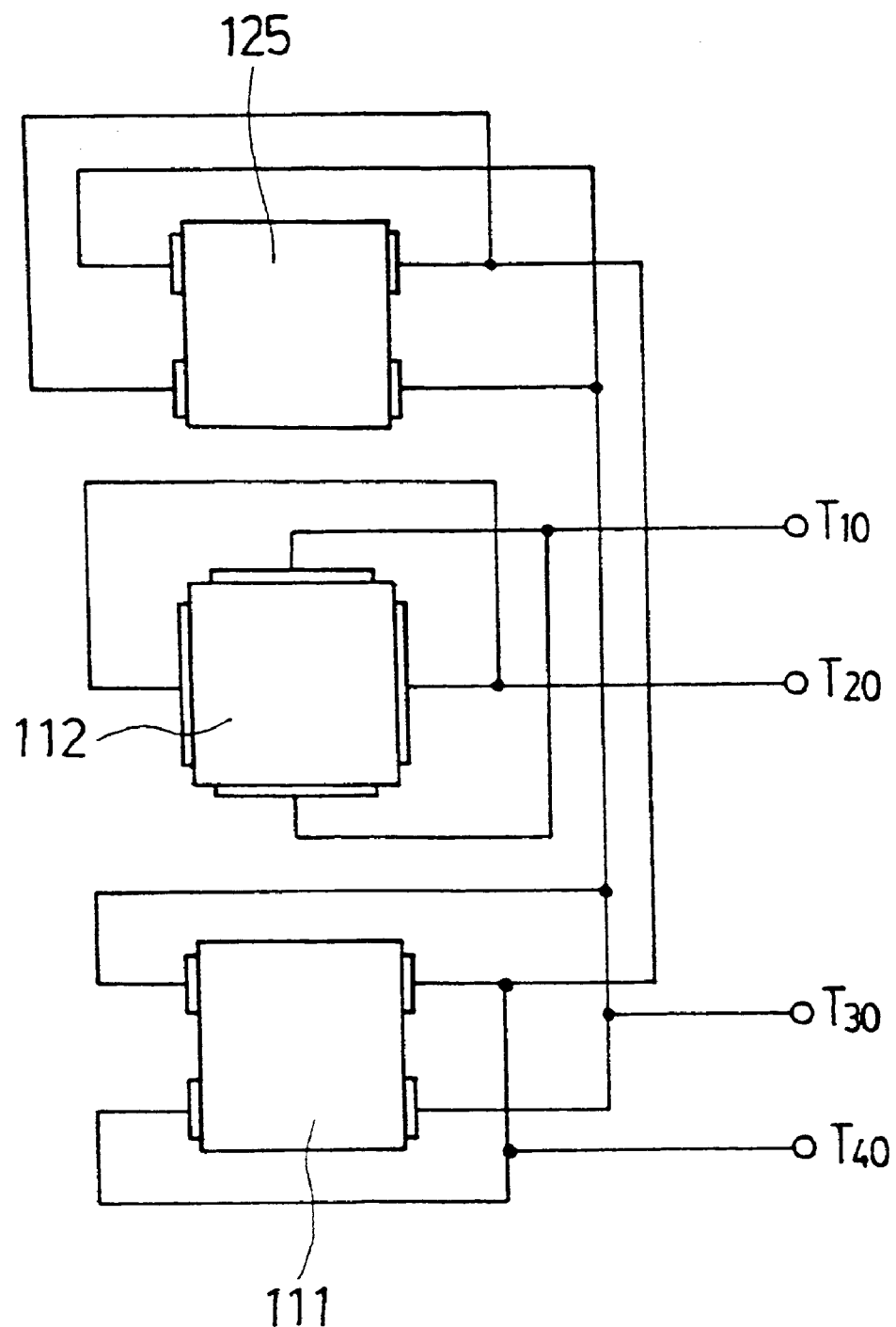
FIG. 23 is a top view showing only each drive arm, sensor arm and only an arrangement of drive electrodes and sensor electrodes in a modification of the three-forked tuning sensor used in the present invention.
Figure 24:
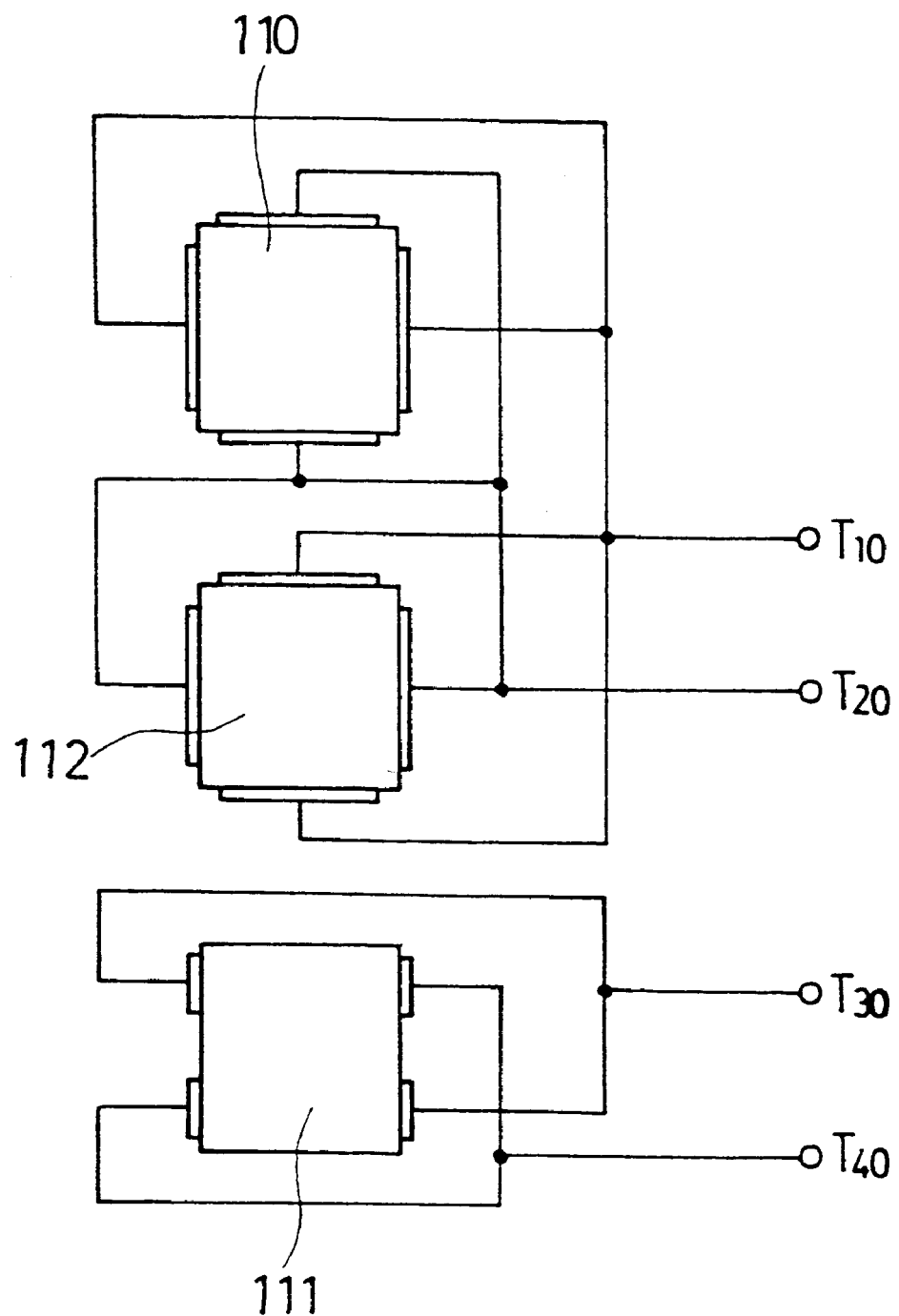
FIG. 24 is a similar top view to FIG. 23 showing another modification of the sensor.
Figure 25:
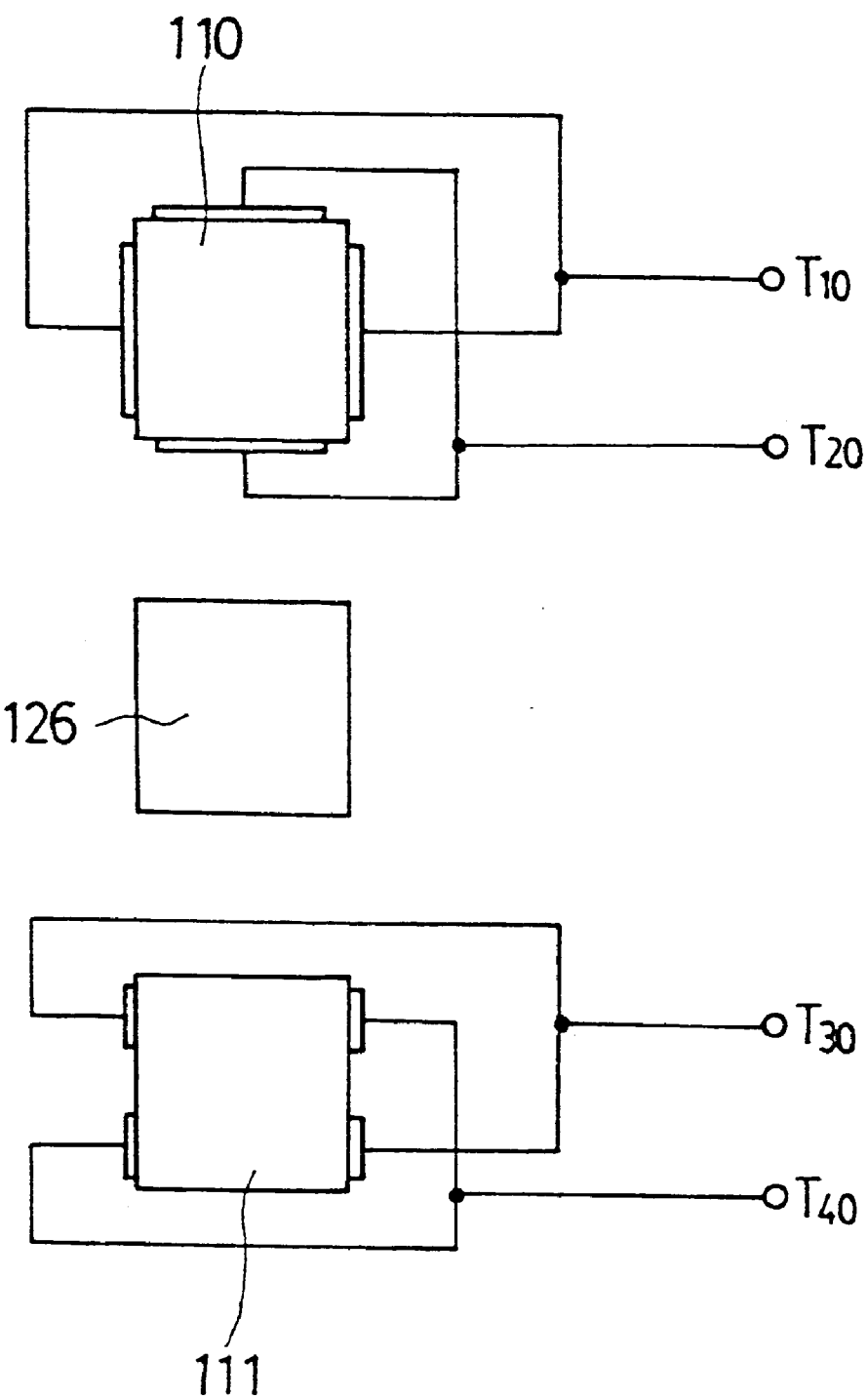
FIG. 25 is a similar top view to FIG. 23 showing still another modification of the sensor.
Figure 26:
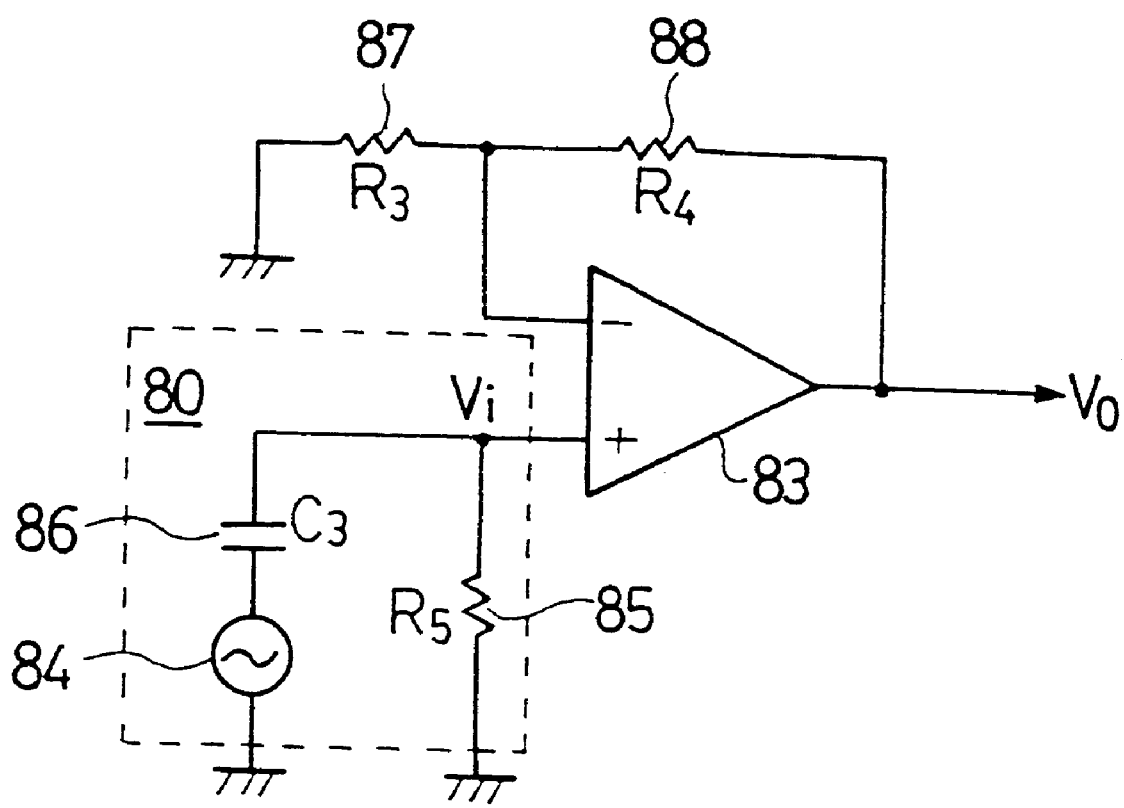
FIG. 26 is a circuit diagram to explain the operation of a sensor circuit in a conventional angular velocity sensing device.
Figure 27:
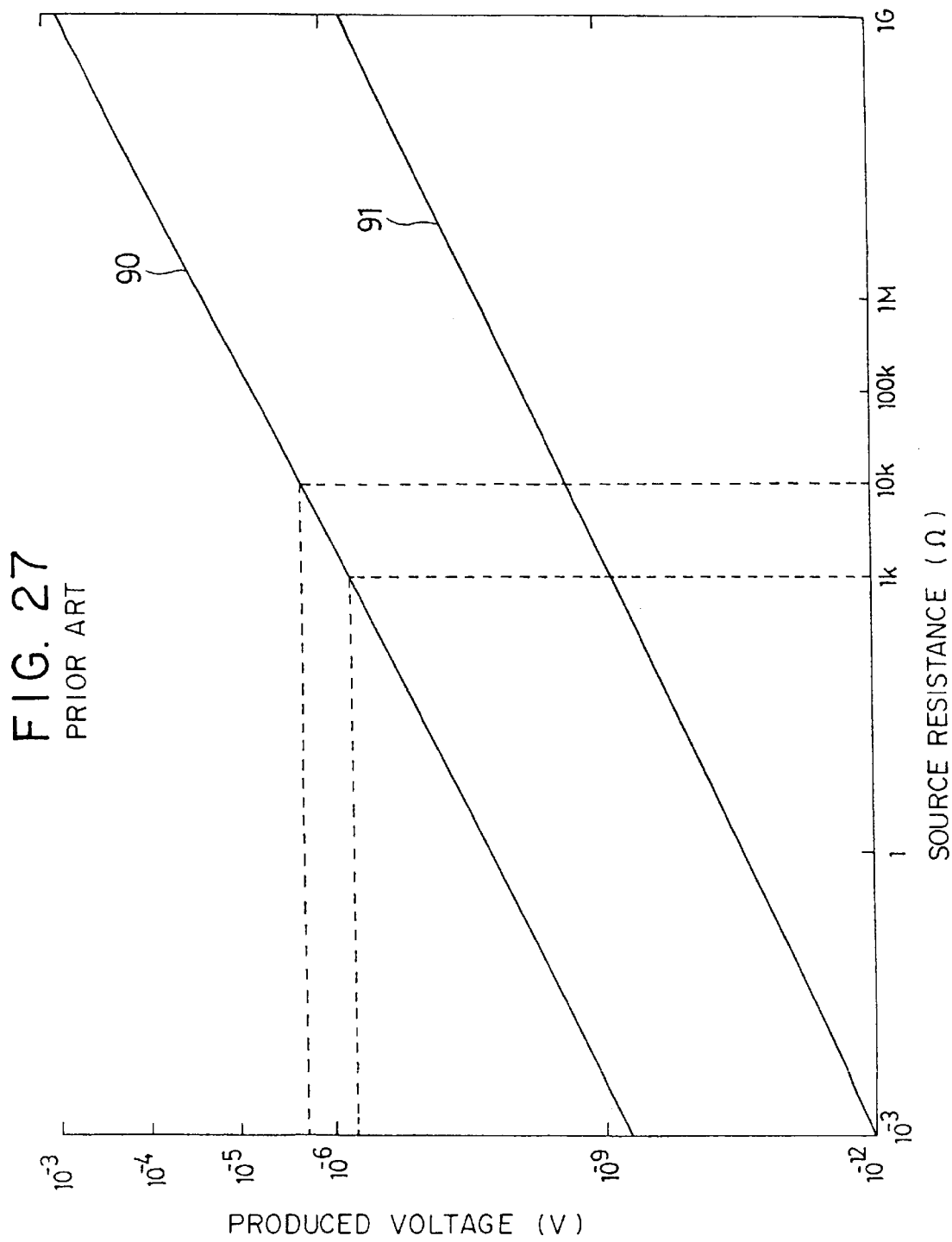
FIG. 27 is a chart showing a theoretical limitation of the voltage measurement in a conventional sensor circuit.

Modification of the Three-forked Tuning Sensor: FIG. 23 to FIG. 25

A variety of examples of modifications of the three-forked tuning sensor used in the fourth to sixth embodiments described above will be shown referring to FIG. 23 to FIG. 25. These figures are top views showing only the arrangement of each drive arm and sensor arm of the three-forked tuning sensor and drive electrodes and sensor electrodes provided thereto, and a base is omitted in the figure.

The three-forked tuning sensor shown in FIG. 23 is provided with two sensor arms 111 and 125, and a drive arm 112 between them. The drive electrodes provided on the opposite faces of the drive arm 112 are connected to each other and led to each terminal T10 and T20. The first sensor electrodes and the second sensor electrodes of the sensor arms 111 and 125 are connected in parallel, and are led to a terminal 30 and a terminal 40, respectively.

Thus, by providing two pieces of the sensor arm, the translational acceleration can be canceled.

In the three-forked tuning sensor shown in FIG. 24, the drive arm 110 replaces a sensor arm 125 in the three-forked tuning sensor shown in FIG. 23, and since the drive arm and the sensor arm are separated, fabrication of an electrode by vacuum evaporation and sputtering is facilitated.

A three-forked tuning sensor shown in FIG. 25 has a configuration in which one end arm out of three arms serves as a drive arm 110, the other end arm serves as a sensor arm 111, and no electrode is provided on the middle arm 126. Thus, by separating the drive arm 110 and the sensor arm 111, detecting accuracy can be enhanced with prevention of electrical coupling.

In each embodiment described above, quartz crystal is used as material for a substrate of the sensing device, but other single crystal materials showing the piezoelectricity such as lithium tantalate single crystal which is 130° Y-plates, lithium niobate single crystal, and lithium borate single crystal, can be used.

Effect of Invention

As explained hereinbefore, since the angular velocity sensing device according to the present invention makes it possible to detect angular velocity with a sensor made of a single crystal material having piezoelectricity, a drive electrode can be formed on the drive arm of the tuning-fork sensor or the three-forked tuning sensor, and a sensor electrode can be formed on the sensor arm directly by vacuum vapor deposition or sputtering, which makes the shape simple. Since the piezoelectric element is not required to be adhered to the sensor, the assembling process becomes simple, the whole size can be reduced, and cost reduction can be realized.

Furthermore, since a piezoelectric single crystal is used for a sensor, the characteristic of not being significantly influenced by temperature is much improved and the degrading of the characteristics with the passing of time can be avoided.

By using the sensor circuit configured is such a manner that the first sensor electrode of the sensor arm of the tuning-fork sensor or the three-forked tuning sensor and the positive-input terminal of the operational amplifier forming a sensor circuit are connected to a ground wire having the same potential, the second sensor electrode and the negative-input terminal of the operational amplifier are connected to each other, and furthermore, the negative-input terminal and the output terminal of the operational amplifier are connected to each other through the feedback resistor, two sensor electrodes are equivalently short-circuited and the short-circuit current is passed through the feedback resistor Rf, so that the short-circuit current can be directly converted into voltage. Therefore, even when equivalent electric impedance between two sensor electrodes is more than 10 k$\Omega$, sufficient sensing output can be obtained without receiving the influence of noise voltage.

What is claimed is:

1. An angular velocity sensing device, comprising:
   a tuning-fork sensor made of a piezoelectric single crystal consisting of a drive arm on which a plurality of drive electrodes are provided and which self-excitedly vibrates at resonance frequency in a predetermine direction (the X or Z direction);
   a sensor arm on which first sensor electrodes and second sensor electrodes are provided and which vibrates in the same direction as that of said drive arm (the X or Z direction) in synchronization with said drive arm, and forcibly vibrates due to a Coriolis force induced by rotation in the direction orthogonal to the direction of said self-excited vibration at the same frequency as the resonance frequency of said drive arm, and a base on which said drive arm and sensor arm are provided in parallel;
   an oscillation circuit connected to each drive electrode of said drive arm to self-excitedly vibrate said drive arm; and
   a sensor circuit having an operational amplifier to detect the vibration of said sensor arm due to the Coriolis force induced by the rotation of said tuning-fork sensor,
   wherein the first sensor electrodes of said sensor arm are connected to a ground wire,
   said sensor circuit is structured in such a manner that a positive-input terminal of said operational amplifier is connected to said ground wire, and the second sensor electrodes of said sensor arm and a negative-input terminal of said operational amplifier are connected to each other, and the negative-input terminal and an output terminal of said operational amplifier are connected to each other through a feedback resistor, and
   equivalent resistance or equivalent electric impedance between said first sensor electrode and the second sensor electrode of said sensor arm is equal to or greater than 10 k$\Omega$.

2. The angular velocity sensing device according to claim 1, wherein a series circuit of a first resistor and a second resistor is connected between the output terminal of the operational amplifier forming said sensor circuit and said ground wire, and the negative-input terminal and the output terminal of said operational amplifier are connected to each other through said feedback resistor and said first resistor.

3. The angular velocity sensing device according to claim 1, wherein a detuning frequency $\Delta f = f0 - f1$ between the resonance frequency $f0$ (Hz) of said drive arm and the resonance frequency $f1$ (Hz) of the sensor arm is in a range between $f1/1000$ and $f1/10$, or $-f1/1000$ and $-f1/10$, when the resonance frequency of the self-excited vibration of said drive arm is $f0$ (Hz), and the resonance frequency of the vibration in the direction orthogonal to the vibrating direction of the self-excited vibration of said drive arm in said sensor arm is $f1$ (Hz).

4. An angular velocity sensing device, comprising:
   a three-forked tuning sensor made of a piezoelectric single crystal which comprises three pieces of arms including at least a drive arm and a sensor arm, and a base on which three arms are provided in parallel to each other; wherein said drive arm has a plurality of drive electrodes and vibrates self-excitedly in a predetermine direction (the X or Z direction) at a resonance frequency, and wherein said sensor arm has first sensor electrodes and second sensor electrodes, vibrates in the same direction as that of said drive arm (the X or Z direction) in synchronization with said drive arm, and forcibly vibrates by a Coriolis force induced by a rotation in the direction orthogonal to the vibration direction of said self-excited vibration at the same frequency as the resonance frequency of said drive arm;
   an oscillation circuit connected to each drive electrode of said drive arm to self-excitedly vibrate said drive arm; and
   a sensor circuit having an operational amplifier to detect the vibration of said sensor arm due to the Coriolis force induced by the rotation of said three-forked tuning sensor,
   wherein the first sensor electrodes of said sensor arm are connected to a ground wire,
   said sensor circuit is structured in such a manner that a positive-input terminal of said operational amplifier is connected to said ground wire, the second sensor electrodes of said sensor arm and a negative-input terminal of said operational amplifier are connected to each other, and the negative-input terminal and an output terminal of said operational amplifier are connected to each other through a feedback resistor, and
   equivalent resistance or equivalent electric impedance between said first sensor electrode and the second sensor electrode of said sensor arm is equal to or greater than 10 k$\Omega$.

5. The angular velocity sensing device according to claim 4, wherein a series circuit of a first resistor and a second resistor is connected between the output terminal of the operational amplifier forming said sensor circuit and said ground wire, and the negative-input terminal and the output terminal of said operational amplifier are connected to each other through said feedback resistor and said first resistor.

6. The angular velocity sensing device according to claim 4, wherein a detuning frequency $\Delta f = f0 - f1$ between the resonance frequency $f0$ (Hz) of said drive arm and the resonance frequency $f1$ (Hz) of the sensor arm is in a range between $f1/1000$ and $f1/10$, or $-f1/1000$ and $-f1/10$, when the resonance frequency of the self-excited vibration of said drive arm is f0 (Hz), and the resonance frequency of the vibration in the direction orthogonal to the vibrating direction of the self-excited vibration of said drive arm in said sensor arm is f1 (Hz).

* * * * *